(12) United States Patent
Rose, Sr.

(10) Patent No.: US 6,864,606 B2
(45) Date of Patent: Mar. 8, 2005

(54) APPARATUS HAVING AN ELECTRICAL MACHINE

(75) Inventor: Robert E. Rose, Sr., Fort Atkinson, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 10/440,975

(22) Filed: May 19, 2003

(65) Prior Publication Data

US 2003/0189338 A1 Oct. 9, 2003

Related U.S. Application Data

(62) Division of application No. 09/835,889, filed on Apr. 16, 2001, now Pat. No. 6,603,227.

(51) Int. Cl.$^7$ ............................................. H02K 7/02
(52) U.S. Cl. .................... 310/74; 310/254; 310/216; 310/153
(58) Field of Search .......................... 310/74, 113, 153, 310/216–218, 254, 258, 259

(56) References Cited

U.S. PATENT DOCUMENTS

| | | | |
|---|---|---|---|
| 2,087,659 A | | 7/1937 | Strong |
| 4,160,435 A | * | 7/1979 | Sleder ........................ 123/599 |
| 4,203,710 A | * | 5/1980 | Farr ........................ 123/195 A |
| 4,376,250 A | | 3/1983 | Baker, Jr. et al. |
| 4,418,677 A | | 12/1983 | Hofmann |
| 4,444,285 A | * | 4/1984 | Stewart et al. ............. 180/65.4 |
| 4,448,279 A | | 5/1984 | Watanabe et al. ........... 180/297 |
| 4,720,638 A | | 1/1988 | Vollbrecht |
| 4,808,842 A | | 2/1989 | Hughes |
| 4,853,553 A | * | 8/1989 | Hosie ....................... 290/40 C |
| 4,853,557 A | | 8/1989 | Meier et al. |
| 4,879,486 A | * | 11/1989 | Yumiyama ................... 310/254 |
| 4,883,973 A | | 11/1989 | Lakey et al. |
| 4,908,540 A | * | 3/1990 | Motodate et al. ........... 310/240 |
| 4,951,769 A | * | 8/1990 | Kawamura ................. 180/65.4 |
| 4,973,896 A | * | 11/1990 | Shiga et al. .............. 290/40 C |
| 4,992,920 A | | 2/1991 | Davis |
| 5,015,941 A | * | 5/1991 | Dhyanchand ............. 290/38 R |
| 5,066,866 A | | 11/1991 | Hallidy |
| 5,086,266 A | | 2/1992 | Shiga et al. |
| 5,173,628 A | * | 12/1992 | Yoshida et al. ................ 310/71 |
| 5,175,439 A | | 12/1992 | Harer et al. ............... 307/10.1 |
| 5,184,058 A | | 2/1993 | Hesse et al. |
| 5,233,952 A | | 8/1993 | Isaka ..................... 123/179.17 |
| 5,270,913 A | | 12/1993 | Limpaecher |
| 5,373,196 A | | 12/1994 | Faley |
| 5,376,877 A | | 12/1994 | Kern et al. |
| 5,415,245 A | | 5/1995 | Hammond ................... 180/165 |
| 5,461,271 A | * | 10/1995 | Asama et al. ................. 310/91 |
| 5,493,200 A | | 2/1996 | Rozman et al. |
| 5,504,417 A | | 4/1996 | Kern et al. |

(List continued on next page.)

FOREIGN PATENT DOCUMENTS

| | | |
|---|---|---|
| EP | 0 903 832 A1 | 3/1999 |
| EP | 0 987 139 A2 | 3/2000 |
| WO | WO 00/51230 | 8/2000 |

*Primary Examiner*—Dang Le
(74) *Attorney, Agent, or Firm*—Michael Best & Friedrich LLP

(57) ABSTRACT

An apparatus such as a vehicle having a generator. The apparatus includes a rotational shaft having a longitudinal axis, a stator having a core and windings disposed on the core, and a rotor coupled to the shaft. The core includes first and second surfaces at least partially surrounding the longitudinal axis. A portion of the first inner surface is disposed a first radial distance from the longitudinal axis, and a portion of the second inner surface is disposed a second radial distance from the longitudinal axis. The second radial distance is greater than the first radial distance.

3 Claims, 18 Drawing Sheets

U.S. PATENT DOCUMENTS

| | | |
|---|---|---|
| 5,543,703 A | 8/1996 | Kusase et al. |
| 5,625,276 A | 4/1997 | Scott et al. |
| 5,656,922 A | 8/1997 | La Velle et al. |
| 5,698,905 A * | 12/1997 | Ruthlein et al. ............ 180/65.4 |
| 5,705,917 A | 1/1998 | Scott et al. |
| 5,734,217 A | 3/1998 | Morinigo |
| 5,767,601 A * | 6/1998 | Uchiyama .................... 310/190 |
| 5,796,195 A * | 8/1998 | Miyakawa .................. 310/261 |
| 5,880,533 A | 3/1999 | Arai et al. |
| 5,886,504 A | 3/1999 | Scott et al. |
| 5,900,722 A | 5/1999 | Scott et al. |
| 5,929,611 A | 7/1999 | Scott et al. |
| 5,942,818 A | 8/1999 | Satoh et al. |
| 5,960,761 A * | 10/1999 | Kawakubo et al. ....... 123/192.2 |
| 5,962,939 A | 10/1999 | Nakamura et al. |
| 5,969,446 A * | 10/1999 | Eisenhaure et al. ............ 310/51 |
| 6,014,015 A | 1/2000 | Thorne et al. |
| 6,018,200 A | 1/2000 | Anderson et al. |
| 6,034,511 A | 3/2000 | Scott et al. |
| 6,084,313 A | 7/2000 | Frank |
| 6,118,186 A | 9/2000 | Scott et al. |
| 6,133,659 A | 10/2000 | Rao |
| 6,138,069 A | 10/2000 | Ellertson et al. |

* cited by examiner

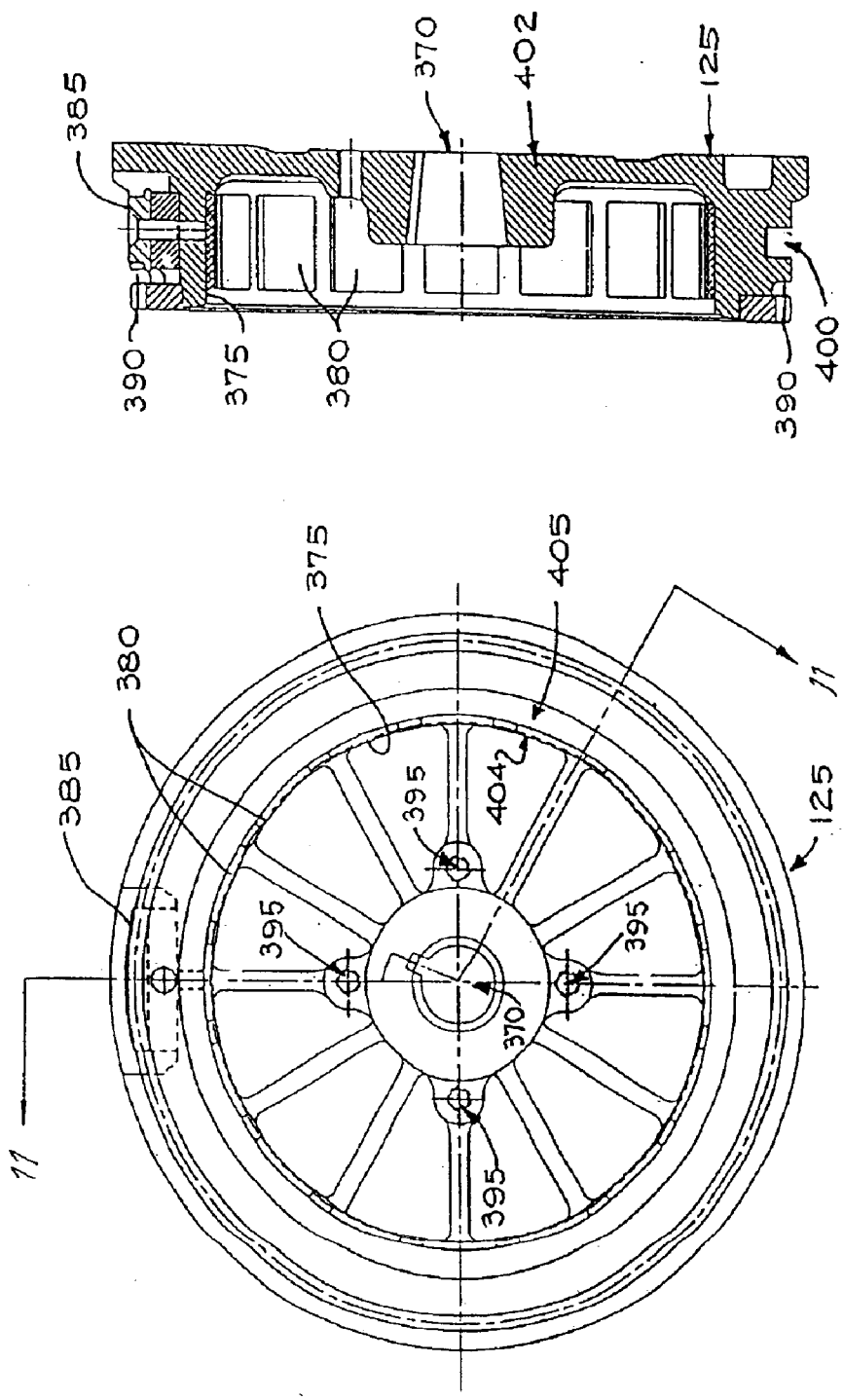

APPARATUS HAVING AN ELECTRICAL MACHINE

RELATED APPLICATIONS

This is a divisional of U.S. patent application Ser. No. 09/835,889, filed Apr. 16, 2001 now U.S. Pat. No. 6,603,227.

BACKGROUND OF THE INVENTION

The invention relates to a vehicle including a generator and, particularly, to a vehicle including a generator that provides a 120-VRMS, 60-Hz power source.

Small mobile generators are capable of providing a stable 120-Volts root-mean-square (VRMS), 60-Hertz (Hz) power source. In addition, because the generators are mobile, the generators may be transported to the desired location where electrical power is needed. However, mobile generators are usually placed on a trailer and pulled to the desired location by a vehicle.

Small-engine vehicles, such as riding lawn mowers, tractors, all-terrain vehicles (ATV's), golf carts, etc., are robust vehicles capable of travelling to remote locations. Small-engine vehicles are also able to pull small mobile generators. However, when the desired location for the generator is in a remote location or across a treacherous landscape, it may be difficult for the small-engine vehicle to pull the trailer carrying the generator to the desired location.

When an operator owns a small-engine vehicle and a mobile generator, the operator's costs increase. In addition, the operator is required to maintain two pieces of machinery (e.g., maintain two engines). This may not be practical when the mobile generator is infrequently used.

SUMMARY OF THE INVENTION

Accordingly, the invention provides a vehicle including a plurality of wheels, an internal combustion engine having a drive shaft interconnected to drive at least one of the wheels, and a generator. The generator includes a stator having a core disposed next to the engine and a winding disposed on the core. The generator further includes a flywheel-rotor apparatus surrounding at least a portion of the stator and having an aperture that receives the drive shaft. The flywheel-rotor apparatus is operable to magnetically interact with the stator to produce a first high-voltage, alternating-current signal in the winding, and to provide inertia to the internal combustion engine. The generator further includes power circuitry electrically connected to the winding. The power circuitry receives the high-voltage, alternating-current signal and controllably generates a second high-voltage, alternating-current signal. The power circuitry includes a regulator that regulates the first high-voltage, alternating-current signal to a high-voltage, direct-current signal, a storage device that stores the high-voltage, direct-current signal, and an inverter that converts the high-voltage, direct-current signal to the second high-voltage, alternating-current signal.

The generator of the engine is capable of being retrofitted onto existing vehicles. For vehicles having a limited engine compartment volume, the invention provides a generator having a stator, including at least one recess that receives at least a portion of an engine housing. That is, the invention further provides a stator including a longitudinal axis and a core. The core includes a first inner surface at least partially surrounding the longitudinal axis, and a second inner surface at least partially surrounding the longitudinal axis. The second inner surface is adjacent to the first inner surface in an axial direction, and the second inner surface at least partially defines a recess. The recess extends in a circumferential direction with respect to the engine housing of the generator. However, although the core is described in connection with a vehicle, the core may be used with other generators and even other motors.

The generator of the invention includes a first winding that generates a first high-voltage AC signal (e.g., a voltage greater than 200-Volts peak-to-peak). The first winding is isolated from a second winding. The second winding may produce a low-voltage signal for storing power on a battery and/or for powering the ignition system.

Thus, in another aspect of the invention, the invention provides a generator including an engine having a shaft, a rotor interconnected with the shaft, and a stator. The stator includes a core having a plurality of teeth that receive wire where the teeth are numbered consecutively from (1) to (x). The stator further includes a first wire disposed on the core to form a first group of coils. The first group of coils forms at least two poles numbered consecutively from (1) to (x−n) with each pole being formed on a respective tooth. The first wire includes first and second ends that exit the core between two adjacent teeth receiving the first group of coils. The stator further includes a second wire disposed on the core to form a second group of coils. The second group of coils forms at least two poles numbered consecutively from (x−n+1) to (x) with each pole being formed on a respective tooth. The second wire has third and fourth ends that exit the core between two adjacent teeth receiving the second group of coils.

The invention further provides a method of winding a stator for a generator. The method includes the step of providing a core including a plurality of teeth formed in the core. The teeth being numbered consecutively from (1) to (x) and receiving wire. The method further includes the step of disposing a first wire having first and second ends on the core to form a first group of coils. The disposing of the first wire includes forming at least two poles numbered consecutively from (1) to (x−n) on respective teeth. The forming of at least two poles includes forming the odd numbered poles of the first group in a first direction and forming the even numbered poles of the first group in a second direction different than the first direction. The disposing or winding of the first wire further includes exiting the first and second ends between two adjacent teeth receiving the first group of coils. The method further includes the step of disposing or winding a second wire having third and fourth ends on the core to form a second group of coils. The disposing of the second wire includes forming at least two poles numbered consecutively from (x−n+1) to (x) on respective teeth. The forming of at least two poles includes forming the odd numbered poles of the second group in the first direction and forming the even numbered poles of the second group in the second direction. The disposing of the second wire further includes exiting the first and second ends between two adjacent teeth receiving the second group of coils.

Other features and advantages of the invention are set forth in the following detailed description, drawings and claims.

BRIEF DESCRIPTION OF THE DRAWINGS

FIG. 10 is a plan view of a flywheel-rotor apparatus from the rear.

FIG. 11 is a cross-sectional side view of the flywheel-rotor apparatus taken along line 11—11 in FIG. 10.

Before any embodiments of the invention are explained in full detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

Figure 1:
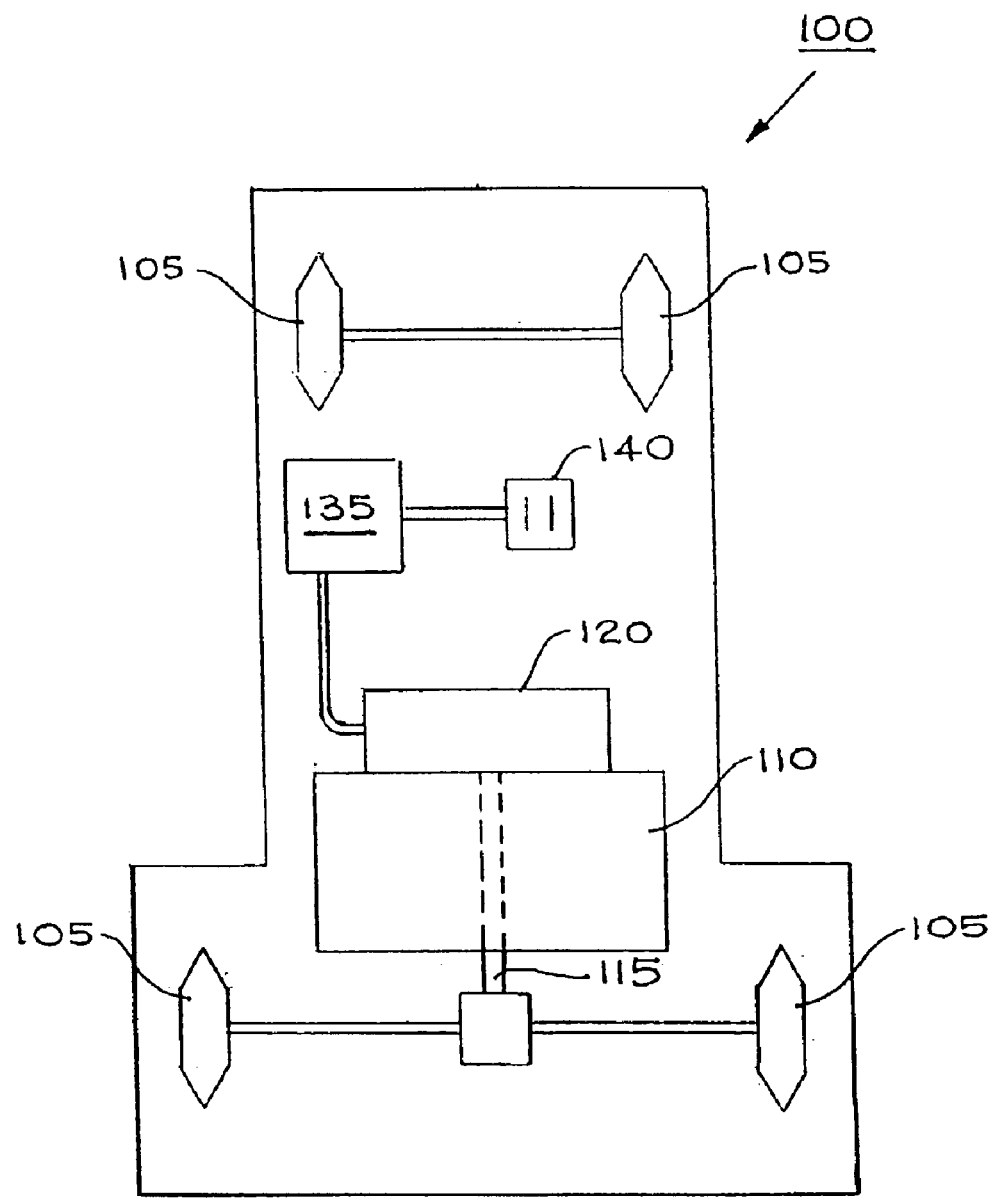
FIG. 1 is a schematic diagram of a vehicle embodying the invention.

A vehicle 100 embodying the invention is schematically shown in FIG. 1. The vehicle 100 includes a plurality of wheels 105 and an internal combustion engine 110 (hereinafter referred to as "engine") interconnected to drive at least one of the wheels 105. That is, the engine 110 (also shown in FIG. 2) produces mechanical power causing a shaft 115 to rotate. One or more wheels 105 are interconnected with the rotating shaft 115 causing the interconnected wheels 105 to rotate. For the embodiment described herein, the vehicle 100 is a riding lawnmower with a Briggs & Stratton, Inc. INTEK™ or DBS™ engine. However, the vehicle 100 may be any vehicle including a small-engine (e.g., a tractor, a lawnmower, an ATV, a golf cart, a motorcycle, etc.)

Figure 2:
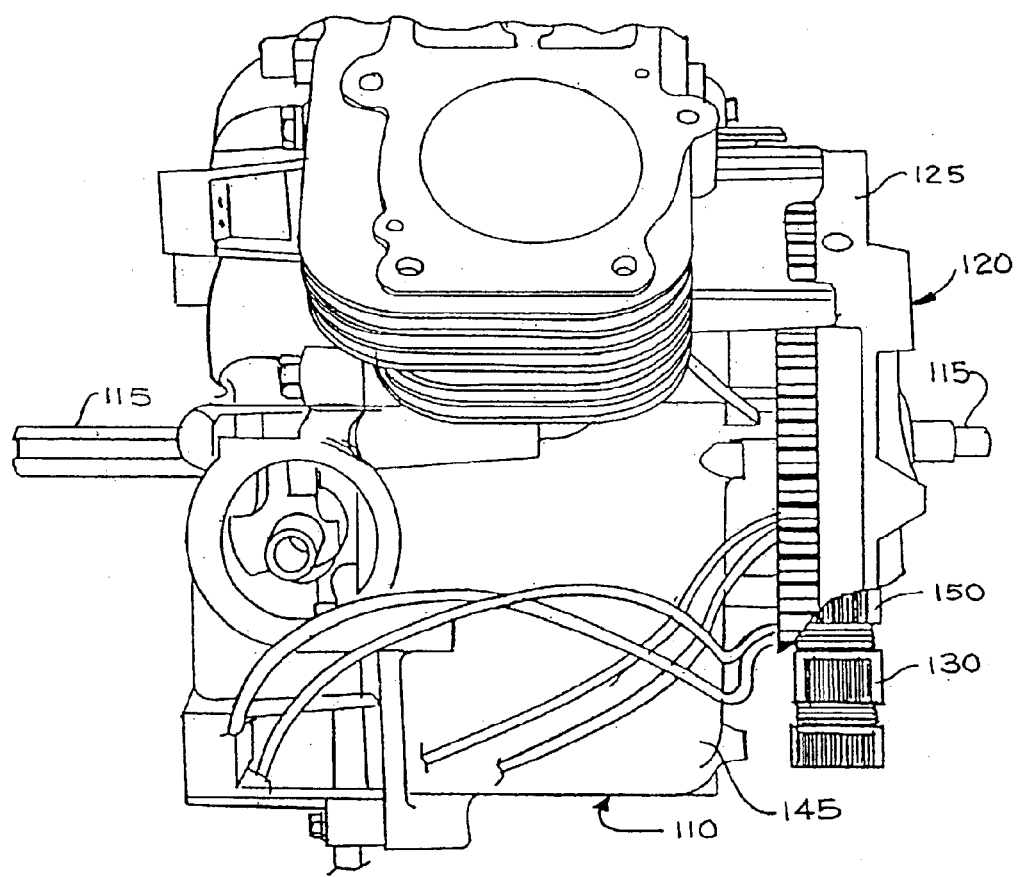
FIG. 2 is a partial side view of an engine and generator combination embodying the invention.

The vehicle 100 further includes an alternator or generator 120 interconnected with the engine 110. In general, the generator 120 includes a flywheel-rotor apparatus 125 (FIG. 2), a stator 130 (FIG. 2), power circuitry 135 (FIG. 1) and an electrical outlet 140 (FIG. 1). As shown in FIG. 2 and shown in partial perspective view FIG. 3, the engine includes a housing 145, and the stator 130 is mounted to the housing 145 by one or more fasteners (discussed below).

Figure 3:
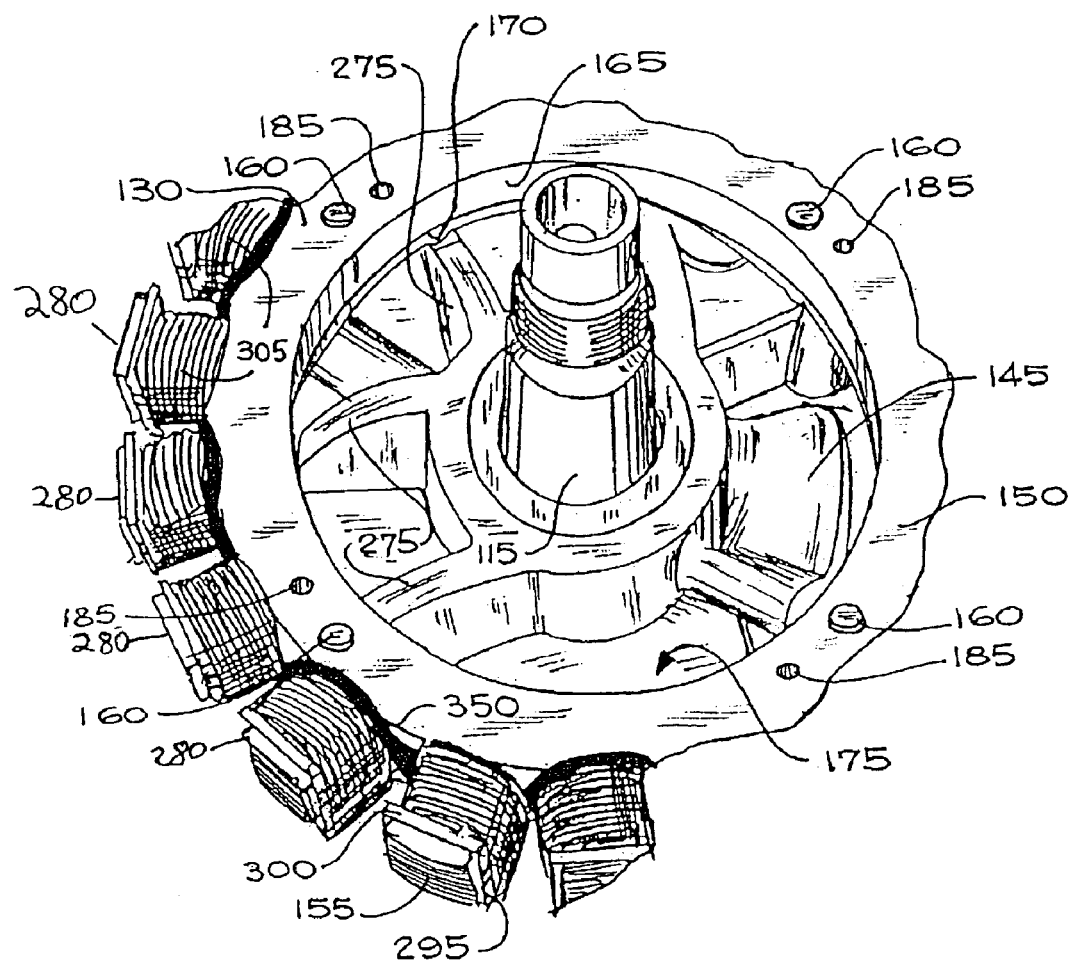
FIG. 3 is a partial perspective view of a stator and an engine housing shown in FIG. 2.
Figure 4:
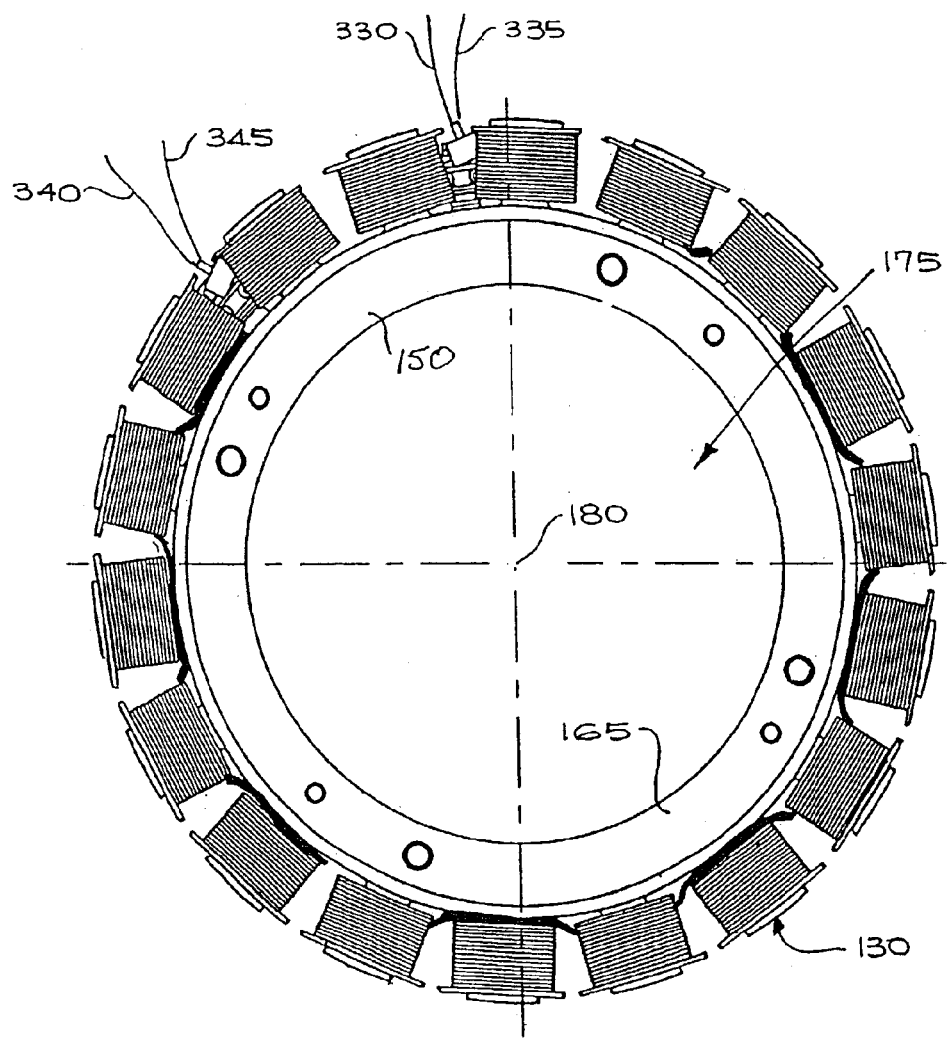
FIG. 4 is a plan view of a first stator viewed from a front side.
Figure 5:
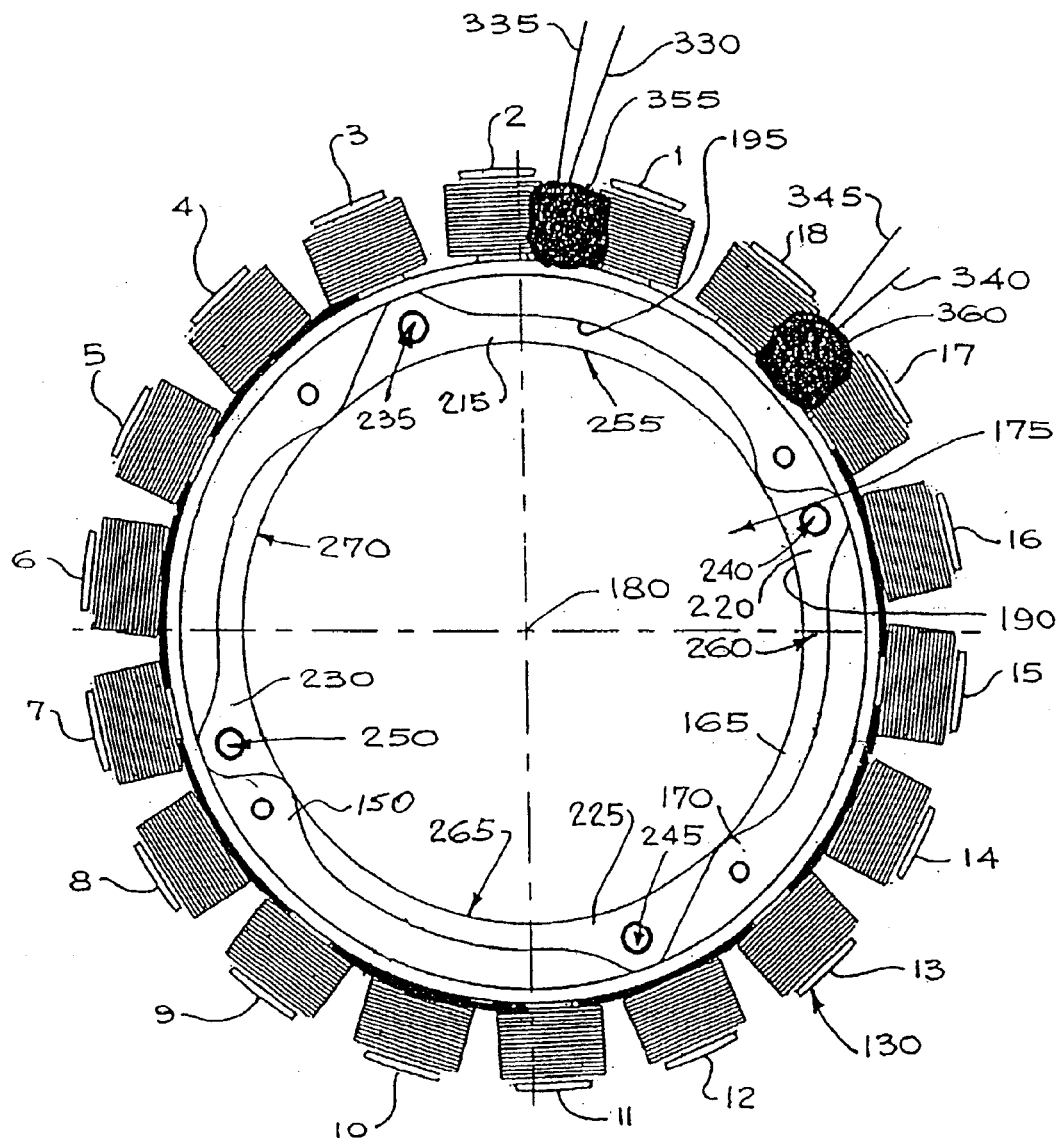
FIG. 5 is a plan view of a first stator viewed from a rear side.

As shown in FIGS. 3, 4 and 5, the stator 130 includes a magnetically permeable stator core 150, which is of generally cylindrical shape. The core 150 is formed by a plurality of stacked laminations 155 (best shown in FIG. 3) mechanically interconnected together by one or more fasteners 160. Alternatively, the core 150 may be a solid core formed by one magnetically permeable member or may be magnetic powdered material compressed to form the core 150. The one or more fasteners 160 may include rivets, bolts, latches, etc., or even an epoxy or glue. In the embodiment shown, the core 150 includes a first plurality of laminations 165 (best shown in FIGS. 3 and 5) and a second plurality of laminations 170 (best shown in FIGS. 3 and 5) fastened by four rivets 160 (best shown in FIG. 3).

The stator 130 includes a central opening 175 having a longitudinal axis 180 (best shown in FIGS. 4 and 5). The stator 130 is mounted on the engine housing 145 such that the central opening 175 receives at least a portion of the shaft 115. The stator 130 is secured to the housing 145 by one or more fasteners (e.g., rivet, bolt, latch, epoxy, glue, etc.) 185.

The stator core 150 forms at least one inner surface at least partially surrounding the longitudinal axis 180. For the embodiment shown and with reference to FIG. 5, the first plurality of laminations 165 form a first inner surface 190 surrounding the longitudinal axis 180, and the second plurality of laminations 170 form a second inner surface 195 that extends in the circumferential direction with respect to the longitudinal axis 180. The second inner surface 195 is adjacent to the first inner surface 190 in the axial direction. The first plurality of laminations 165 further includes first, second, third and fourth shelves 215, 220, 225 and 230, and first, second, third and fourth apertures 235, 240, 245 and 250. The first shelf 215 and a portion of the second inner surface 195 partially define a first recess 255, the second shelf 220 and a portion of the second inner surface 195 partially define a second recess 260, the third shelf 225 and a portion of the second inner surface 195 partially define a third recess 265, and the fourth shelf 230 and a portion of the second inner surface 195 partially define a fourth recess 270.

The recesses 255, 260, 265 and 270 result in a volume of the stator core 150 that is "removed" as compared to a core that has only one plurality of substantially similarly designed laminations of cylindrical shape (e.g., discussed below). The creation of the recesses 255, 260, 265 and 270 allows the recesses 255, 260, 265 and 270 to extend in the circumferential direction for receiving a portion of the housing 145. By creating the recesses 255, 260, 265 and 270, the stator 130 of the invention maybe retrofitted on existing engines 110 where space is an issue.

For example, the housing 145 of a prior art engine may include a structure that would otherwise result in interference (e.g., rib structures 275 as shown in FIG. 3). In addition, the amount of engine compartment volume of the vehicle (i.e., the space "under the hood") may be of concern. In order to mount the generator 120 within the existing volume, the recesses 255, 260, 265 and 270 may be created in the stator 130. The recesses 255, 260, 265 and 270 allow one or more structures to extend into the one or more recesses 255, 260, 265 and 270 (e.g., the rib structures 275 shown in FIG. 3 extend into the one or more recesses 255, 260, 265 and 270.) This allows the stator 130 to sit closer to the engine 110 than if no recess was created.

Furthermore, one or more apertures 235, 240, 245 or 250 may extend through recesses 255, 260, 265 and 270, respectively, in the longitudinal direction. The apertures allow the stator 130 to be mounted closer to the engine housing 145. Having the stator 130 sit closer to the engine housing 145 allows for the engine and generator combination to be more compact and fit within an existing engine compartment volume of an existing vehicle.

Figure 6:
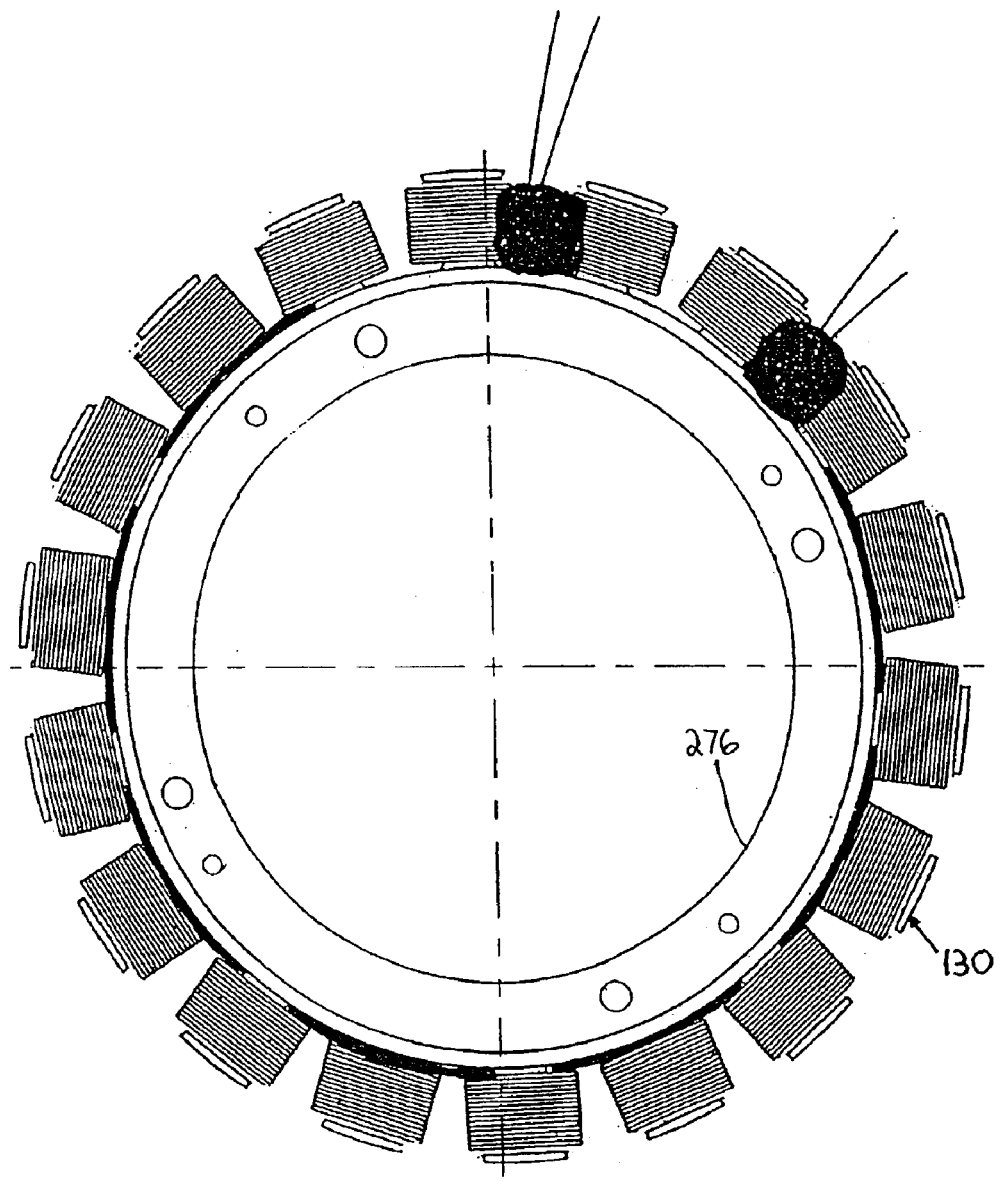
FIG. 6 is a plan view of a second stator viewed from a rear side.

In another embodiment of the invention, the stator core 276 (shown in FIG. 6) does not include one or more recesses. For this embodiment, space is not an issue. Rather, the stator 130 of this embodiment uses a "cylindrical" stator core 276 that generates more power than a core having at least one recess (e.g., a core 150 shown in FIG. 5).

Figure 7:
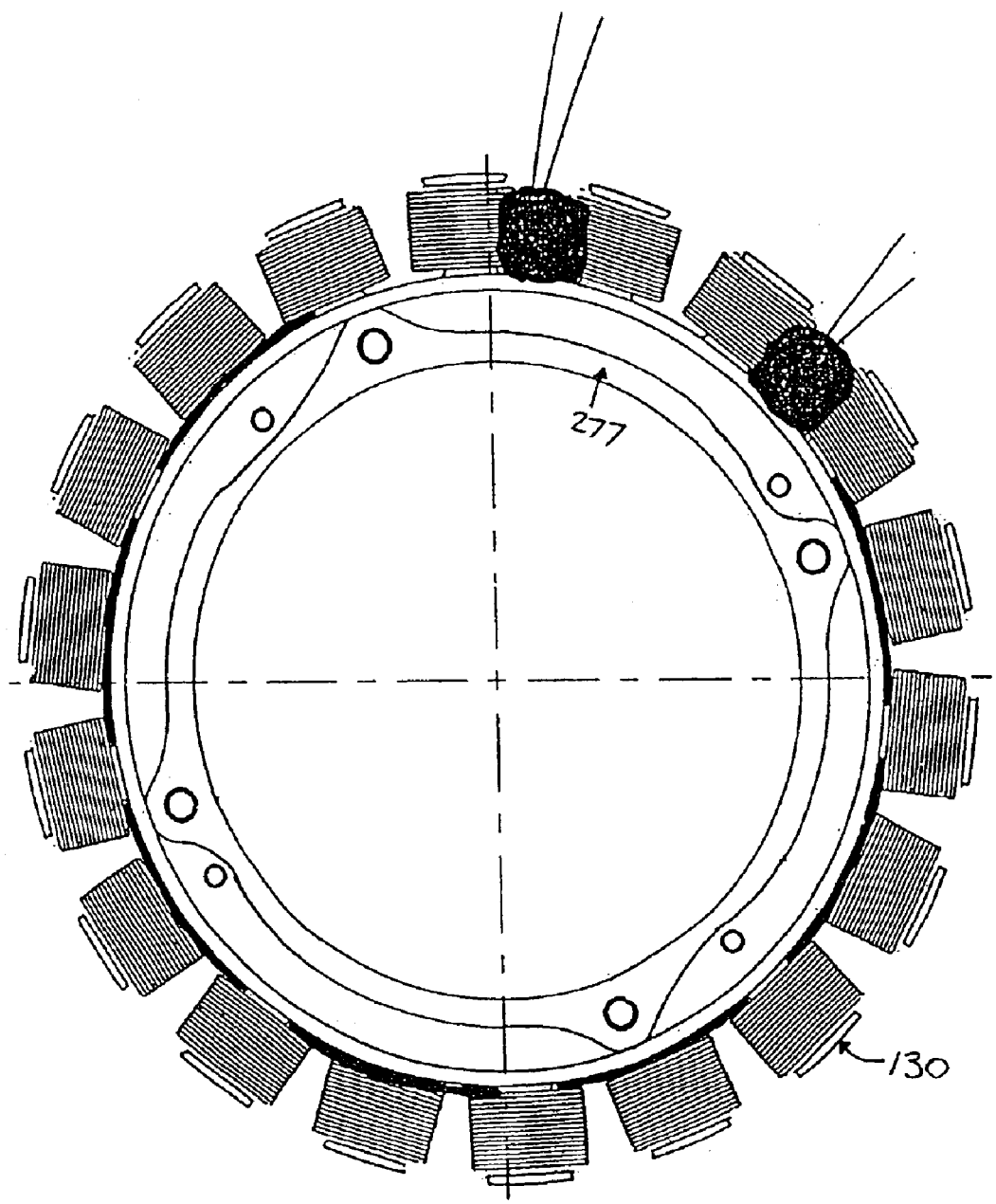
FIG. 7 is a plan view of a third stator viewed from a rear side.

In another embodiment of the invention, the second plurality of laminations partially define one recess 277 that completely surrounds the longitudinal axis (shown in FIG. 7). In addition, for other embodiments, the number of recesses may vary and the amount of volume of a recess may vary.

Figure 8:
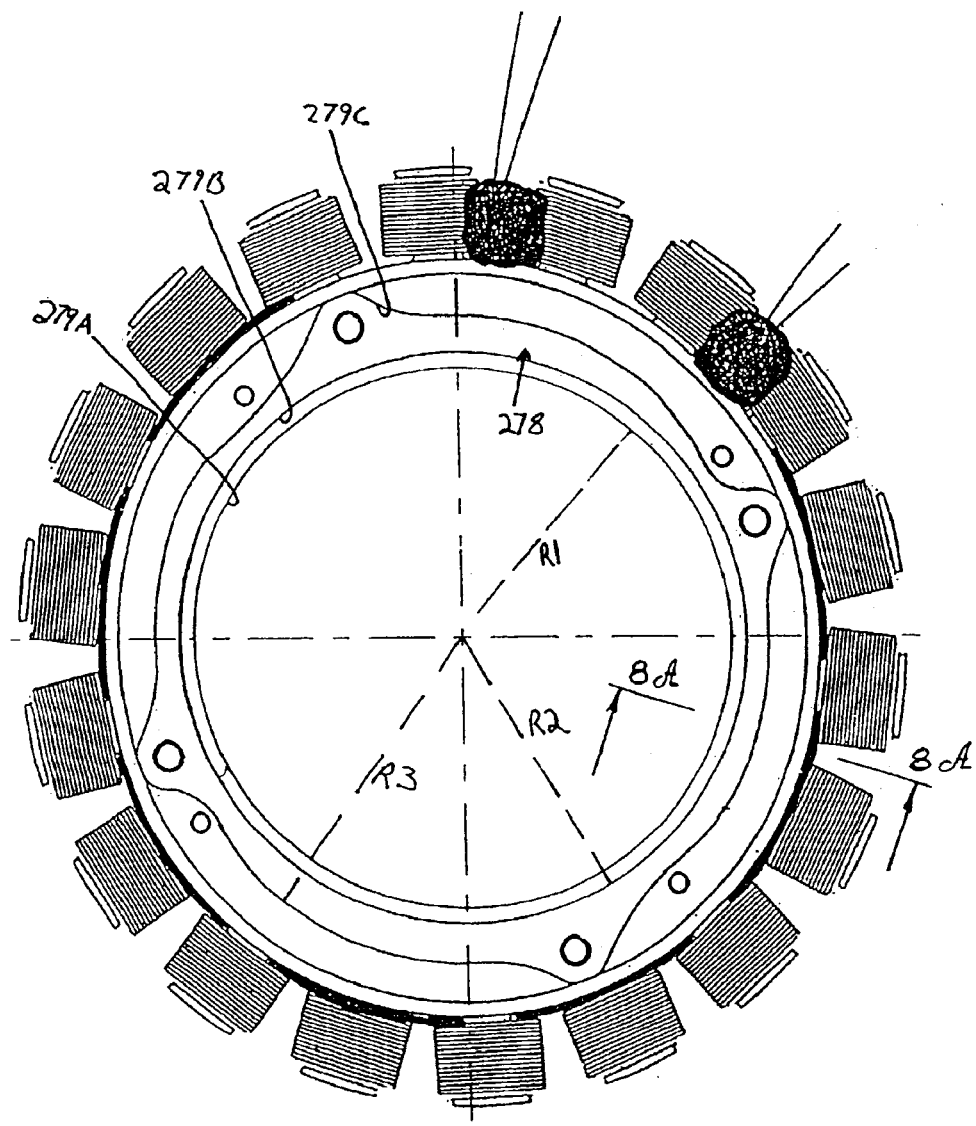
FIG. 8 is a plan view of a fourth stator viewed from a rear side.
Figure 8A:
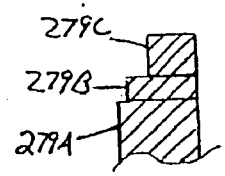
FIG. 8(a) is a cross-sectional side view of the stator taken along line 8A—8A in FIG. 8.

In another embodiment of the invention, the recess 278 (shown in FIG. 8) is formed by at least three sets of laminations 279A, 279B and 279C. Specifically, the recess 278 is formed by gradually varying the radius R1, R2 and R3 of at least a portion of each set of laminations in the axial direction. For another embodiment of the invention, the one or more recesses may be defined by a solid core. For some solid core embodiments, the one or more recess are defined by a continuously varying radius in the longitudinal direction.

As best shown in FIG. 3, the stator 130 further includes a plurality of radially-extending teeth 280 and insulators 295 and 300 disposed on the teeth 280. The teeth 280 receive one or more electrical wires 305 that surround the insulators 295 and 300. The insulators 295 and 300 electrically isolate the wires 305 from the stator core 150. For the embodiment shown, the insulators 295 and 300 are first and second plastic insulators disposed on the core 150. Furthermore, for the embodiment shown, the number of teeth, which may be represented by the number (x), is equal to eighteen and the number of wires 305 is equal to two. However, the number of teeth may vary and the number of wires may vary. For example, in another embodiment of the invention, the number of teeth is equal to twenty. Changing the number of teeth enables more power to be generated.

Figure 9:
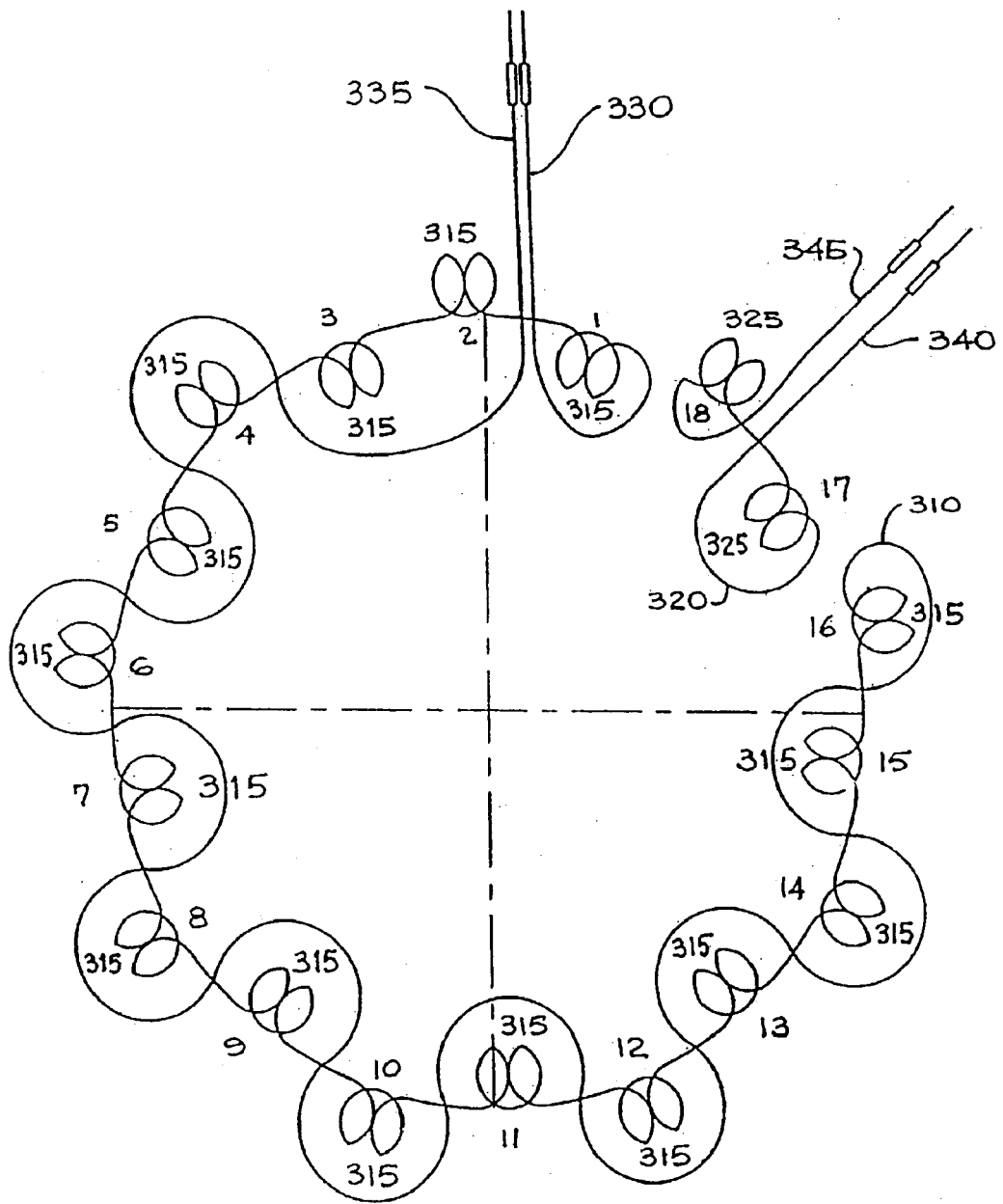
FIG. 9 is a schematic representation of a stator-winding scheme.

As best shown in FIG. 5, the teeth 280 (FIG. 3) are numbered from 1 to (x) (e.g., 1 to 18). As schematically shown in FIG. 9, a first wire 310 is wound around a first plurality of teeth to form a first plurality of coils 315. The first plurality of coils 315 create a first plurality of magnetic poles that interact with a plurality of magnets (discussed below) of the flywheel-rotor apparatus 125. A second wire 320 is wound around a second plurality of teeth to form a second plurality of coils 325. The second plurality of coils 325 create a second plurality of magnetic poles that interact with the plurality of magnets (discussed below) of the flywheel-rotor apparatus 125.

Specifically, for the embodiment schematically shown in FIG. 9, the core 150 includes a plurality of teeth numbered from 1 to 18. The first wire 310 is wound on the core 150 to form a first group of coils 315. The first group of coils 315 forms at least sixteen poles numbered 1 to 16 with each pole being formed on a respective tooth 1 to 16. The first wire 310 includes first and second ends 330 and 335 that exit the core between two adjacent teeth receiving the first group of coils 315. For the embodiment shown, the first and second ends 330 and 335 exit the core between the first and second teeth. The second wire 320 is disposed on the core 150 to form a second group of coils 325. The second group of coils 325 form at two poles numbered 17 and 18 with each pole being formed on a respective tooth 17 and 18. The second wire 320 includes third and fourth ends 340 and 345 that exit the core between two adjacent teeth receiving the second group of coils 325. For the embodiment shown, the third and fourth ends 340 and 345 exit the core between the seventeenth and eighteenth teeth.

Although the first group of coils 315 form a first group of poles 1 to 16 and the second group of coils 325 form a second group of poles 17 and 18, the number of poles of each group may vary. For example, the first group of poles may be numbered from one to (x−n) where (x) is the total number of poles or teeth and (n) is the number of poles in the second group. For the second group, the poles are numbered from (x−n+1) to (x). Thus, for the embodiment shown, (x) is eighteen and (n) is two. In another embodiment of the invention, (x) is twenty and (n) is two.

As will be discussed in further detail below, the flywheel-rotor apparatus 125 magnetically interacts with the stator 130 to generate a first voltage in the first wire 310 and generates a second voltage in the second wire 320, where the first voltage is greater than the second voltage. For example, the first voltage may be greater than approximately 200-Volts peak-to-peak, and the second voltage may be less than approximately 50-Volts peak-to-peak. The voltage (and power) generated in each wire 310 or 320 is determined in part on the number of poles formed by the respective group of coils. In other words, varying the number of poles in a group of coils varies the voltage generated by the group of coils. For example, varying the number of poles for the first group of coils 315 from sixteen to eighteen increases the voltage generated by the first group of coils 315. Thus, depending on the voltage required by a group of coils, the number of poles (and teeth) may vary.

In addition, varying the number of turns of each coil also increases the voltage generated by the group of coils. For example, if the number of turns for each coil changes from fifteen to twenty, then a higher voltage is generated for the group of coils.

For the winding scheme shown, the first and second ends 330 and 335 exit between two adjacent teeth receiving the first group of coils 315 (e.g., between teeth 1 and 2), and the third and fourth ends 340 and 345 exit between two adjacent teeth receiving the second group of coils 325 (e.g., between teeth 17 and 18). One reason for this is that undesirable noise is transmitted from the first and second ends to the third and fourth ends due to the first group of coils generating a much higher voltage than the second group of coils. By having the first and second ends exit between two teeth of the first group of coils and by having the third and fourth ends exit between two teeth of the second group of coils, the noise is reduced. Although the embodiment described herein has the first and second ends exit between the first and second teeth, the first and second ends may exit between two other adjacent teeth receiving the first group of coils. Similarly, if the number of teeth receiving the second group of coils varies (e.g., (n) is equal to 4), then the third and fourth ends may exit between any two adjacent teeth receiving the second group of coils. However, if noise is not a concern, then other winding schemes may be used for the vehicle.

As shown in FIG. 9, the coils forming the odd numbered poles of the first group (e.g., poles 1, 3, 5, 7, 9, 11, 13, 15) are wound in a first direction (e.g., counterclockwise when viewing the core 150 from the rear), and the coils forming the even numbered poles of the first group (e.g., poles 2, 4, 6, 8, 10, 12, 14, 16) are wound in a second direction (e.g., counterclockwise when viewing the core 150 from the rear). The second direction is different than the first direction. Similarly, the coils forming the odd numbered poles of the second group (e.g., pole 17) are wound in the first direction, and the coils forming the even numbered poles of the second group (e.g., pole 18) are wound in the second direction.

One method of disposing the first and second wires 310 and 320 on the stator 130 is as follows. As schematically shown in FIG. 9, the first wire 310 is wound on the core 150 to form the first group of coils 315. The first group of coils 315 is formed by placing the first end 310 between teeth 1 and 2 and winding the wire around tooth 1 in the first direction. Next, the wire 310 is then wound to tooth 2 and a second coil is wound around tooth 2 in the second direction. The wire 310 then proceeds to tooth 3 and is wound around tooth 3 in the first direction. Next, the wire proceeds to tooth 4 and is wound around tooth 4 in the second direction. The winding on the first group of coils 315 is wound similarly for the remaining teeth 6–16, where the odd number poles are wound in the first direction and the even number of poles are wound in the second direction.

After winding the first wire 310 around tooth 16, the second wire 320 is cut to form the second end 330. An insulator 350 (e.g., a "shrink-tube" insulator) (FIG. 3) is disposed around the second end 330 and the first wire 310 is interwound back to tooth 2. That is, the first wire 310 is wound for a half turn around tooth 16, proceeds to the tooth 15, and is wound a half turn around tooth 15 (FIG. 9). The first wire 310 is wound for half turns around the remaining teeth back to tooth 2 and exits between teeth 1 and 2. The insulator 350 protects the half-turn winding from short-circuiting with the coils of the respective teeth. For example, the half-turn winding around tooth 7 does not short circuit with the coil that forms pole 7. The first and second ends 330 and 335 exit between the teeth 1 and 2 receiving the first and second coils. To strain relieve the first and second ends 330 and 335, an epoxy 355 (FIG. 5) may be applied to ends 330 and 335.

Similar to the first wire 310, the second wire 320 having third and fourth ends 340 and 345 is disposed on the core 150 to form the second group of coils 325. The second group of coils is formed by placing the third end 340 between tooth 17 and winding the wire around tooth 17 in the first direction. Next, the second wire 320 is then wound to tooth 18 and a second coil is wound around tooth 18 in the second direction. After winding the second wire 320 around tooth 18, the second wire 320 is cut to form the fourth end 345. The third and fourth ends 340 and 345 then exit between teeth 17 and 18. To strain relieve the third and fourth ends 340 and 345, an epoxy 360 (FIG. 5) may be applied to ends 340 and 345.

For the embodiment shown, (n) is equal to two. However, if (n) is greater than two, then the winding scheme for the second wire 320 may be similar to the winding scheme for the first wire 310.

Referring back to FIG. 2, the generator 120 further includes a flywheel-rotor apparatus 125 that is coaxially aligned with the stator 130. As best shown in FIGS. 10 and 11, the flywheel-rotor apparatus 125 includes a first central opening 370 for receiving the drive shaft 115 (FIG. 2). When the drive shaft 115 rotates, the flywheel-rotor apparatus 125 also rotates. The rotating flywheel-rotor apparatus 125 induces a magnetic field within the stator 130 causing a current to be generated in each wire 310 and 320.

Referring again to FIGS. 10 and 11, the flywheel-rotor apparatus 125 includes a third inner surface 375 at least partially surrounding the stator 130. The flywheel-rotor apparatus 125 further includes a plurality of rotor magnets 380 (e.g., eighteen magnets) mounted by fasteners (e.g., an epoxy or glue) to the third inner surface 375. In the embodiment show, the rotor magnets 380 are neodymium-iron-boron (NdFeB) magnets. The flywheel-rotor apparatus 125 further includes an ignition magnet 385 mounted in the exterior of the flywheel-rotor apparatus 125 for generating an ignition signal, gearing teeth 390 disposed in the exterior of the flywheel-rotor apparatus 125 for interconnecting the flywheel-rotor apparatus 125 to an engine starting motor, apertures 395 for receiving a fan plate having fins for cooling the engine and generator, and one or more balancing holes 400 used for balancing the flywheel-rotor apparatus 125.

The flywheel-rotor apparatus 125 includes a flywheel portion 402 interconnected with a rotor portion 404. The rotor portion 404 includes the magnets 380 and a back-iron 405. The rotor portion 404 is external to the stator 130 and magnetically interacts with the stator 130. The flywheel portion 402 is an additional mass formed integral with the rotor portion 404 and may include a portion of the rotor back-iron 405. The flywheel portion 404 evens out the rotation of the drive shaft 115 while the engine 110 is running. The additional mass of the flywheel portion 402 is necessary for the internal-combustion engine 110 to operate properly and the rotor portion 404 is necessary to produce the magnetic field for the generator 120. By combining the flywheel and rotor portions 402 and 404 into one apparatus 125, the number of parts is reduced and the amount of space required for the engine/generator combination 110 and 120 is reduced.

Figure 12:
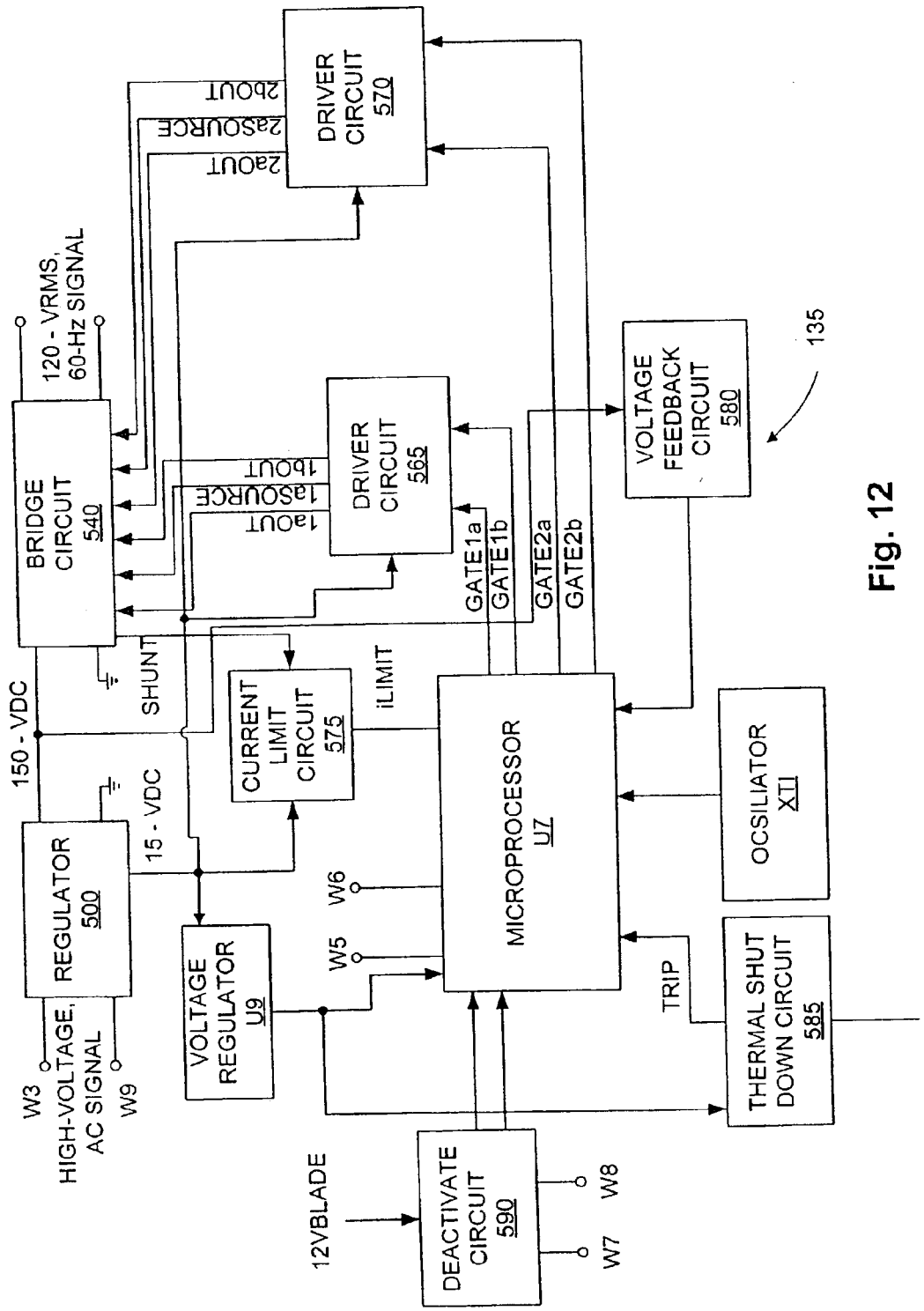
FIG. 12 is a schematic diagram of power circuitry schematically shown in FIG. 1.
Figure 13:
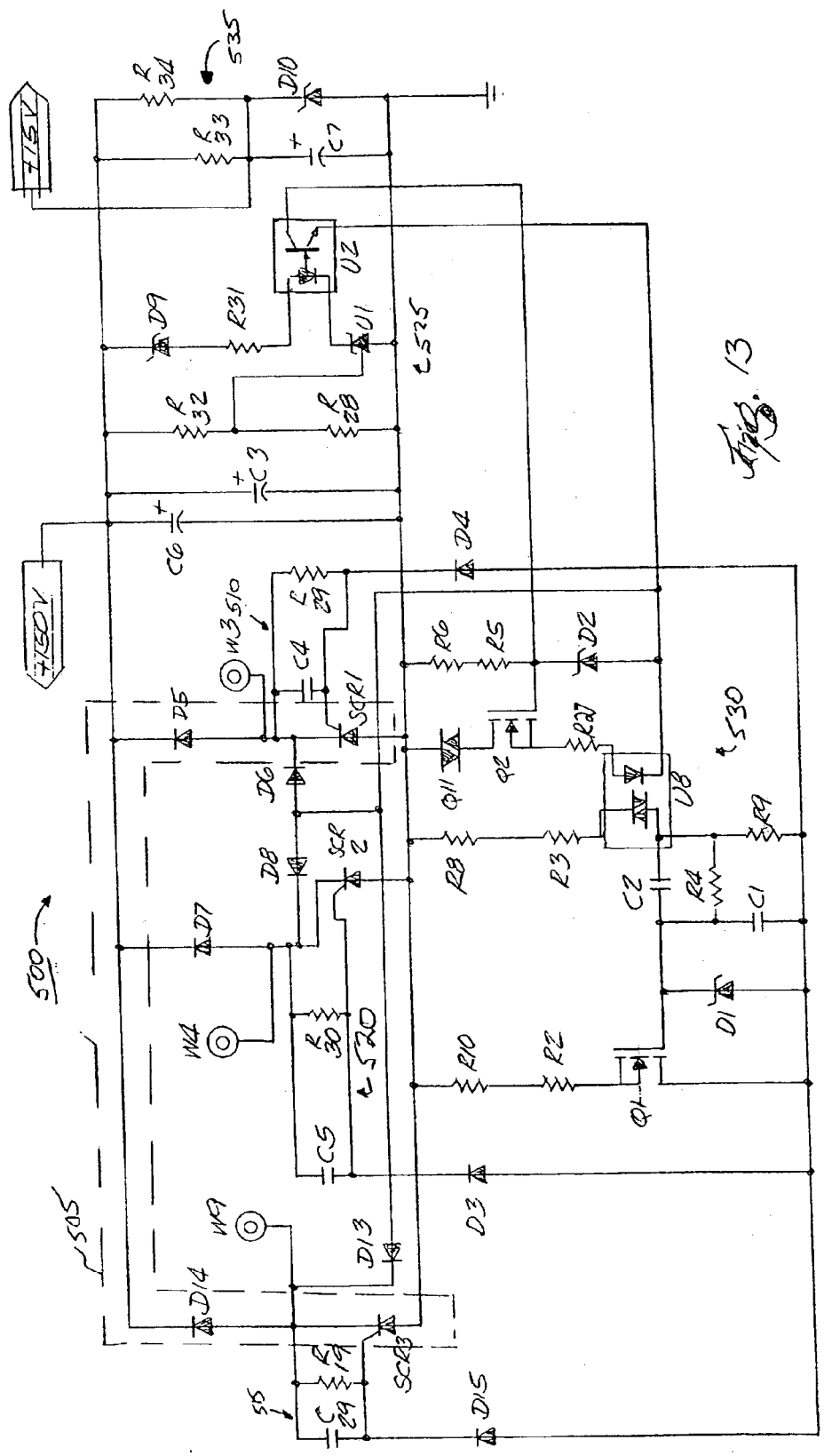
FIG. 13 is an electrical schematic of a regulator schematically shown in FIG. 12.

FIG. 12 shows a schematic diagram of the power circuitry 135, and FIGS. 13–18 show an electrical schematic of the power circuitry 135. With reference to FIGS. 12 and 13, the power circuitry includes a regulator 500. As used herein, the regulator 500 receives a high-voltage, alternating-current (AC) input, and rectifies and regulates the received alternating current to generate a high-voltage DC output. The high-voltage, AC input is received at terminals W3 and W9 from first and second ends 330 and 335. For the embodiment described herein, the low-voltage DC output is approximately 15-VDC and the high-voltage DC output is approximately 150-VDC. However, the low-voltage and high-voltage DC output voltages may vary. Even further, for the embodiment described, the high-voltage DC signal may vary depending on the load attached to the power circuitry 135.

The high-voltage AC input may be a single-phase AC input generated by the above-described stator 130, may be a single-phase AC input generated by another stator, or a three-phase AC input generated by a stator having three-phase windings. Unless specified otherwise, the description below is for a single-phase AC input produced by the above described stator 130.

With reference to FIG. 13, the rectifier/regulator 500 includes a bridge rectifier 505. The bridge rectifier includes diodes D5 and D14 forming the upper portion of the bridge rectifier 505, and silicon-controlled rectifiers SCR1 and SCR3 forming the lower portion of the bridge rectifier 505. Diodes D4 and D15 provide an input or control signal for controlling the bridge rectifier 505. First filter 510 (resistor R29 and capacitor C4) filters the control signal provided to silicon-controlled rectifier SCR1 and second filter 515 (resistor R19 and capacitor C29) filters the control signal provided to silicon-control rectifier SCR2. Filtering the control signals provided to the silicon-controlled rectifiers SCR1 and SCR2 prevents the silicon-controlled rectifiers SCR1 and SCR2 from being too sensitive. During operation of the bridge rectifier 505, the rectifier 505 receives the high-voltage AC input generated by the stator 130 via inputs W9 and W3, rectifies and regulates the AC input in response to the control signals being provided to the silicon-controlled rectifiers SCR1 and SCR3, and provides a high-voltage DC output. The high-voltage DC output is stored on capacitors C6 and C3, which act as a DC bus. For the embodiment described, the high-voltage DC output is preferably 150-VDC. But, depending on the load attached to the power circuitry 135, the DC bus may fluctuate between 100-VDC and 150-VDC. If the stator 130 is a three-phase stator, then the bridge rectifier includes input W4, diode D7, silicon-control rectifier SCR2, and third filter 520 (resistor R30 and capacitor C5).

The rectifier/regulator 500 further includes a voltage monitor 525 and a trigger circuit 530. The voltage monitor 525 includes opto-isolator U2, precision voltage reference U1, zener diode D9 and resistors TU8, R31 and R32. The trigger circuit 530 includes zener diodes D1 and D2, metal-oxide semiconductor field-effect transistors (MOSFETs) Q1 and Q2, opto-isolator U8, diac Q11, capacitors C1 and C2, and resistors R2, R3, R4, R5, R6, R8, R9, R10 and R27. The voltage monitor 525 and the trigger circuit 530 control the bridge rectifier 505 to provide a continues bus voltage between, 130-VDC and 150-VDC. Specifically, the trigger circuit 530 acts as a phase control that activates the silicon-control rectifiers SCR1 and SCR3 depending on the amount of power required to be added to the DC bus. For example, if the voltage monitor 525 senses a voltage on the DC bus greater than 150-VDC, then the trigger circuit 530 triggers the silicon-controlled rectifiers SCR1 and SCR3 later in the phase of the high-voltage AC input. This results in less energy being provided to the DC bus and, therefore, a lower voltage. Similarly, if the voltage monitor 525 senses a voltage on the DC bus less than 150-VDC, then the trigger circuit 530 causes the silicon-controlled rectifiers SCR1 and SCR3 to activate sooner in the phase of the high-voltage AC input. This results in more energy being provided to the DC bus and, consequently, a higher voltage. The voltage monitor 525 and the trigger circuit 530 attempt to regulate the DC bus voltage to approximately 150-VDC. However, depending on the load attached to the power circuitry 135, the DC bus voltage may range between 130-VDC and 150-VDC. Of course, other voltages may be used for the DC bus.

The rectifier/regulator 500 further includes a low-voltage DC power supply 535. The low-voltage DC power supply 535 includes zener diode D10, capacitor C7 and resistors R33 and R34. The low-voltage DC power supply 535 receives the high-voltage DC output and produces a low-voltage DC output. For example, the low-voltage DC signal may be 15-VDC. Of course, other low-voltage DC outputs may be used.

Referring back to FIG. 12, the power circuitry 135 further includes a bridge circuit 540. For the embodiment shown (FIG. 14), the bridge circuit 540 is an H-bridge circuit. The bridge circuit 540 includes first branch 545 (MOSFETs Q9, Q10 and Q14, resistor bridge 42, and resistor R22), second branch 550 (MOSFETs Q7, Q8, and Q15, resistor bridge R20, and resistor R25), third branch 555 (MOSFETs Q5, Q6, and Q12, resistor bridge R21, and resistor R14), and fourth branch 560 (MOSFETs Q3, Q4, and Q13, resistor bridge R13, and resistor R18). The bridge circuit 540 receives the high-voltage DC bus, and produces a 120-VRMS, 60-Hz AC output at terminals W1 and W2 in response to a plurality of drive signals 1aOUT, 1bOUT, 2aOUT and 2bOUT. Of course, other output voltages and frequencies (e.g., a 100-VRMS, 50-Hz AC output) may be produced. In addition, other bridge circuits may be used. For example, the embodiment shown in FIG. 14 has three MOSFETs in each branch. For a different embodiment, the number of MOSFETs may vary (e.g., two MOSFETs) depending on the capacity of the MOSFETs and the maximum expected current generated by the bridge circuit 540.

Figure 14:
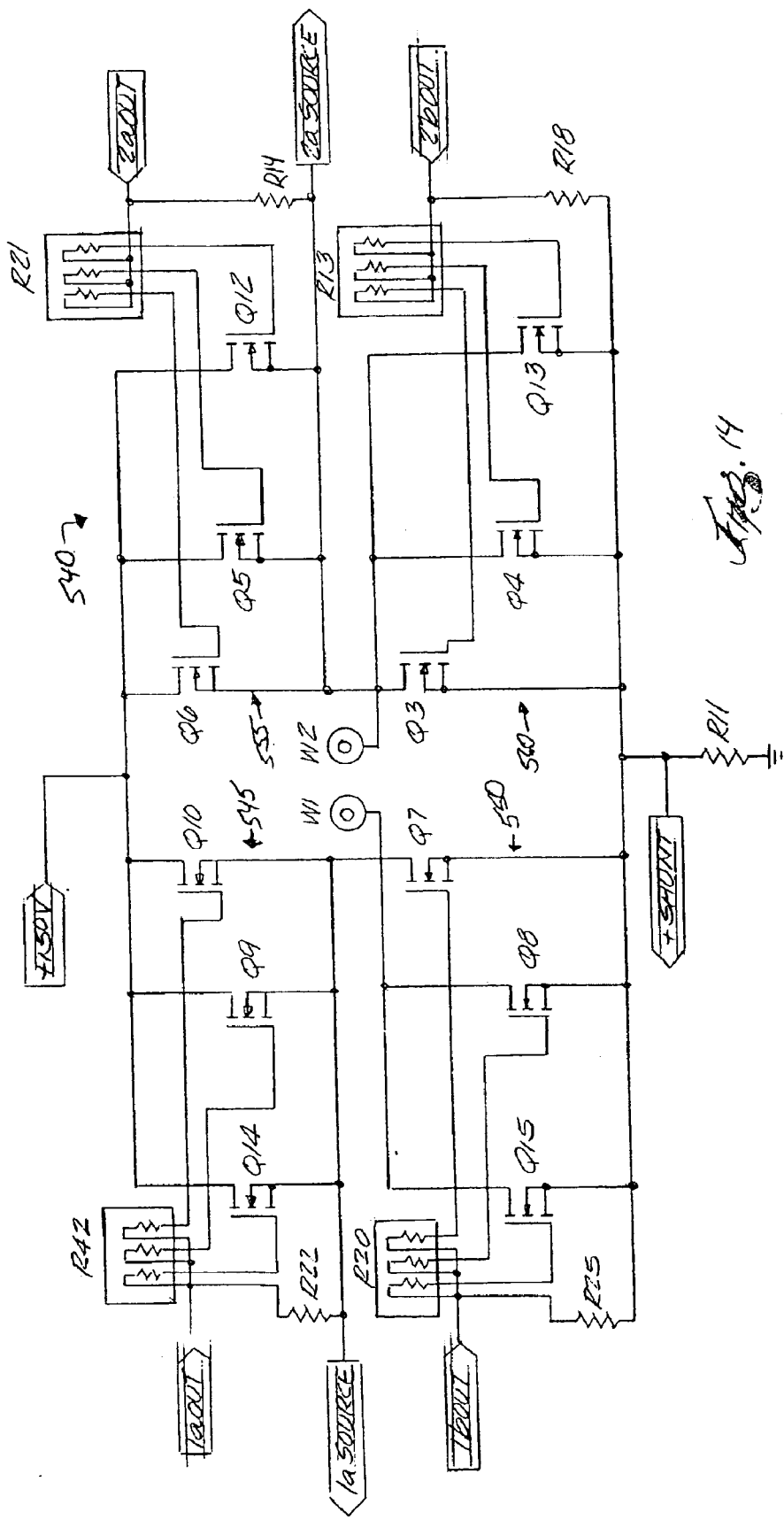
FIG. 14 is an electrical schematic of a bridge circuit schematically shown in FIG. 12.
Figure 15:
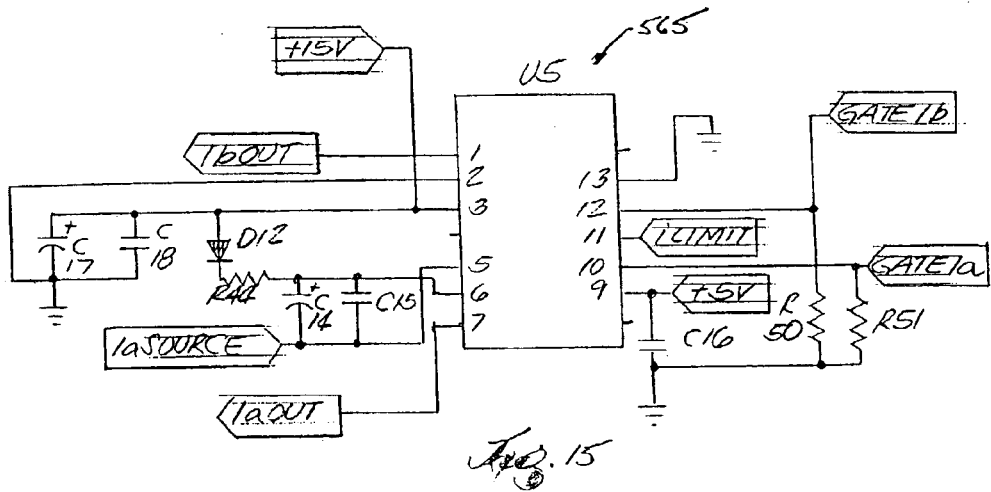
FIG. 15 is an electrical schematic of a first driver circuit schematically shown in FIG. 12.
Figure 16:
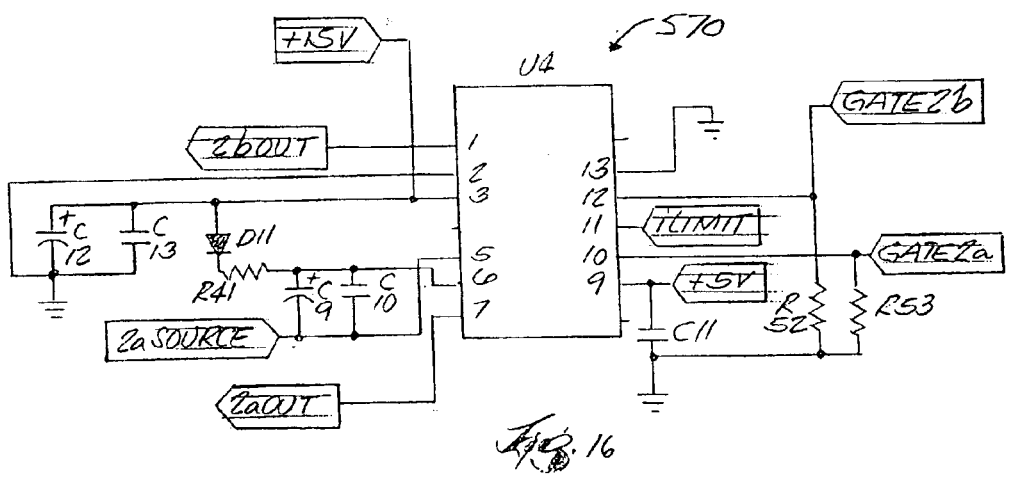
FIG. 16 is an electrical schematic of a second driver circuit schematically shown in FIG. 12.
Figure 17:
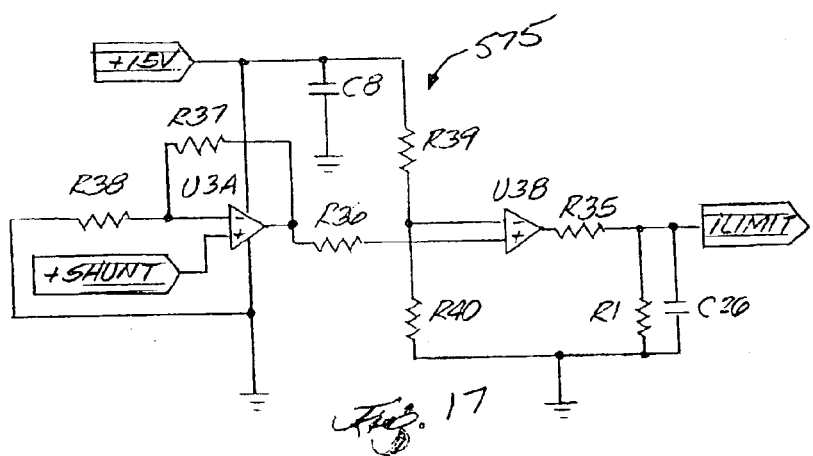
FIG. 17 is an electrical schematic of a current limit circuit schematically shown in FIG. 12.

The drive signals 1aOUT, 1bOUT, 2aOUT and 2bOUT, and floating ground signals 1aSOURCE and 2aSOURCE are provided to the bridge circuit 540 by driver circuits 565 and 570 (FIGS. 12, 15 and 16). First driver circuit 565 (FIG. 15) includes driver U5, capacitors C14, C15, C16, C17, C18, resistors R44, R50 and R51, and diode D12. The first drive circuit 565 drives the first and second branches 545 and 550 (FIG. 14) with the signals 1aOUT, 1bOUT and 1aSOURCE in response to gate signals GATE1a and GATE1b (discussed below). The second drive circuit 570 includes driver U4, capacitors C9, C10, C11, C12, C13, resistors R41, R52 and R53, and diode D11. The second drive circuit 570 (FIG. 16) drives the third and fourth branches 555 and 560 with the signals 2aOUT, 2bOUT and 2aSOURCE in response to the signals GATE2a and GATE2b (discussed below).

During operation of the bridge circuit 540 and the first and second driver circuits 565 and 570, an output signal is generated at terminals W1 and W2 (FIG. 14). The output is a pulse-width-modulated (PWM) signal having a frequency of approximately sixty Hz and a voltage of approximately 120-VRMS. Specifically, the first and second drivers 565 and 570 drive the MOSFETs Q3, Q4, Q5, Q6, Q7, Q8, Q9, Q10, Q12, Q13, Q14 and Q15, to produce a PWM 120-VRMS, 60-Hz signal at W1, W2. Each cycle includes a square wave that is PWM to produce the required RMS voltage. The width of each half cycle is widened or narrowed depending on the DC bus voltage. If the DC bus voltage is low, then the width of each half cycle is widened. Conversely, if the DC bus voltage is high, then the width of the half cycle is narrowed. Thus, based on the drive signals provided to the bridge circuit 540, the output of the bridge circuit 540 maintains a relatively constant 120-VRMS, 60-Hz signal at outputs W1 and W2.

The output signals 1aOUT, 1bOUT, 1aSOURCE, 2aOUT, 2bOUT, and 2aSOURCE result from gate signals GATE1a, GATE1b, GATE2a and GATE2b. The GATE signals GATE1a, GATE1b, GATE2a, and GATE2b are generated by a microprocessor (discussed below). The first and second drivers U4 and U5 translate the gate signals GATE1a, GATE1b, GATE2a and GATE2b to 15-VDC drive signals (i.e., 1aOUT, 1bOUT, 2aOUT and 2bOUT). The 15-VDC drive signals are necessary to drive the MOSFETs Q3, Q4, Q5, Q6, Q7, Q8, Q9, Q10, Q12, Q13, Q14 and Q15. The signals 1aSOURCE and 2aSOURCE provide a floating reference to the bridge circuit 540.

The bridge circuit 540 shown in FIG. 14 includes a shunt resistor R11. The shunt resistor R11 is a power shunt for measuring the output current of the bridge circuit 540. The shunt resister R11 is used to determine if an overload current is present i.e., if an operator is applying too large of a load to the bridge circuit 540. If too large of a load is present, the microprocessor (discussed below) narrows the pulse width of the 120-VRMS, 60-Hz output so that it cannot deliver too large of a current through the bridge circuit 540. The current measurement signal SHUNT is provided to a current limit circuit 575 (shown in FIG. 17). The current limit circuit 575 includes operational amplifiers U3A, U3B, resistors R1, R35, R36, R37, R38, R39, and R40, and capacitors C8 and C26. The operational amplifiers U3A amplifies the signal SHUNT, and the operational amplifier U3B acts as a comparator between a reference signal and the amplified SHUNT signal. The reference signal is formed by resistors R39 and R40. The reference signal is set such that the peak current created by the bridge circuit cannot exceed a maximum peak current (e.g., forty-five amps). The maximum peak current is the maximum safe current the MOSFETs Q3, Q4, Q5, Q6, Q7, Q8, Q9, Q10, Q12, Q13, Q14 and Q15 can handle without burning out. The current limit signal iLIMIT is provided to the microprocessor (discussed below).

Figure 18:
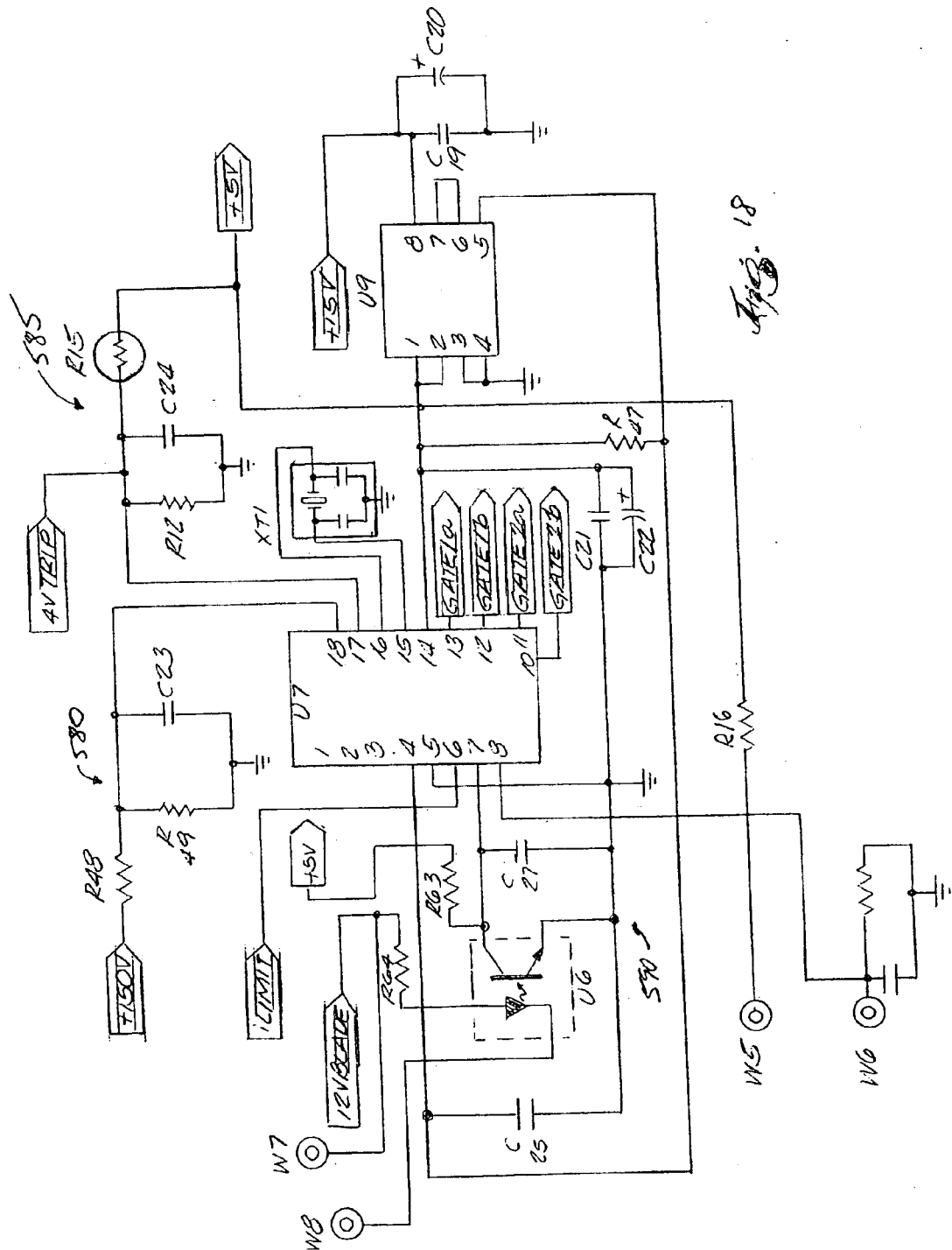
FIG. 18 is an electrical schematic of a microprocessor, a voltage feedback circuit, a thermal shutdown circuit, and a voltage regulator schematically shown in FIG. 12.

As shown in FIGS. 12 and 18, the power circuitry 135 includes microprocessor U7. The microprocessor U7 receives and executes a software program from memory. Based on the inputs provided to the microprocessor U7, the microprocessor controls the driver circuits 565 and 570 with gate signals GATE1a, GATE1b, GATE2a and GATE2b. Specifically, the software determines the pulse width of each half cycle generated by the bridge circuit 540 based on the inputs provided to the microprocessor U7. For example, one of the input signals is the current limit signal iLIMIT. If the signal iLIMIT signifies that the current to the load is excessive, the microprocessor U7 controllably reduces the width of the PWM output signal.

As shown in FIGS. 12 and 18, the power circuitry 135 further includes a voltage feedback circuit 580. The voltage feedback circuit 580 includes resistors R48 and R49 and capacitor C23. The voltage feedback circuit 580 reduces the voltage from the DC bus to a 0-VDC to 5-VDC signal. The feedback from the DC bus informs the microprocessor U7 what the DC voltage is on the high-voltage bus.

As shown in FIGS. 12 and 18, the power circuitry 135 further includes a thermal shut down circuit 585. The thermal shut down circuit 585 includes a thermistor R15, a capacitor C24 and a resistor R12. The thermistor R15 is mounted near the MOSFETs Q3, Q4, Q5, Q6, Q7, Q8, Q9, Q10, Q12, Q13, Q14 and Q15, and senses the temperature generated by the bridge circuit 540. If the bridge circuit 540 generates an excessive temperature, thermistor R15 conducts and generates a high-logic signal TRIP. The microprocessor U7 receives the high-logic signal TRIP and stops producing the 120-VRMS, 60-Hz output. An example temperature may be 90–100 degrees Celsius. The higher the temperature gets, the sooner the thermal shut down circuit 585 generates the high-logic signal TRIP.

As shown in FIGS. 12 and 18, the power circuitry 135 further includes an oscillator XT1 for providing an oscillating signal to the microprocessor U7 and a voltage regulator U9 for generating a 5-VDC VCC signal. The power circuitry 135 further includes a deactivate circuit 590 including resistors R63 and R64, capacitors C25 and C27 and optoisolator U6. The deactivate circuit 590 receives a 12-VDC blade signal 12BLADE or a 12-VDC input signal from terminals W7 and W8. When no twelve-volt signal is present, the microprocessor U7 prevents the 120-VRMS, 60-Hz signal from being generated. Alternatively, if the 12-VDC signal is present then the power circuitry 135 may generate an output. For example, if the generator 110 is mounted on a lawnmower, then the 12-BLADE signal informs the microprocessor U7 whether the blade is running. If the blade is rotating, the power circuitry 135 does not produce an output.

As shown in FIGS. 12 and 18, inputs W5 and W6 receive a signal from a power switch. The power switch is an on/off switch that the operator activates and deactivates for controlling the power circuitry 135. In the embodiment described herein, the power switch has to be turned ON from the OFF position in order for the power circuitry 135 to generate any power. For example, if an operator turns the engine on while the power switch is already in the ON position, then the microprocessor U7 does not allow an output from the power circuitry 135. This prevents an accidental output from being generated. In order to enable the power circuitry 135, the switch must be moved to the OFF position and then returned to the ON position.

In operation, when an operator starts the vehicle 100, the engine 110 causes the drive shaft 115 to rotate and, consequently, the flywheel/rotor apparatus 125 to rotate. The flywheel/rotor apparatus 125 uses its inertia to smooth-out the rotation of the drive shaft 115. This allows the engine to run evenly for driving the rotation of the wheels 105. In addition, the magnetic fields produced by the rotor magnets 380 interact with the stator resulting in a current being generated in the first and second wires 310 and 320. The current produced in the second wire 320 is provided to the engine ignition system and/or the engine battery, and the current produced in the first wire 310 is provided to the power circuitry 135. The current that is provided to the power circuitry 135 is first regulated to produce a high-voltage DC output and a low voltage-DC output. The high-voltage DC output is stored in a storage device (e.g., capacitors C3 and C6). The storage device acts as a DC bus voltage. The low-voltage DC signal is provided to, among other things, the VCC regulator for generating a five-volt VCC signal. The 5-VDC VCC signal is provided to the microprocessor U7.

Figure 19:
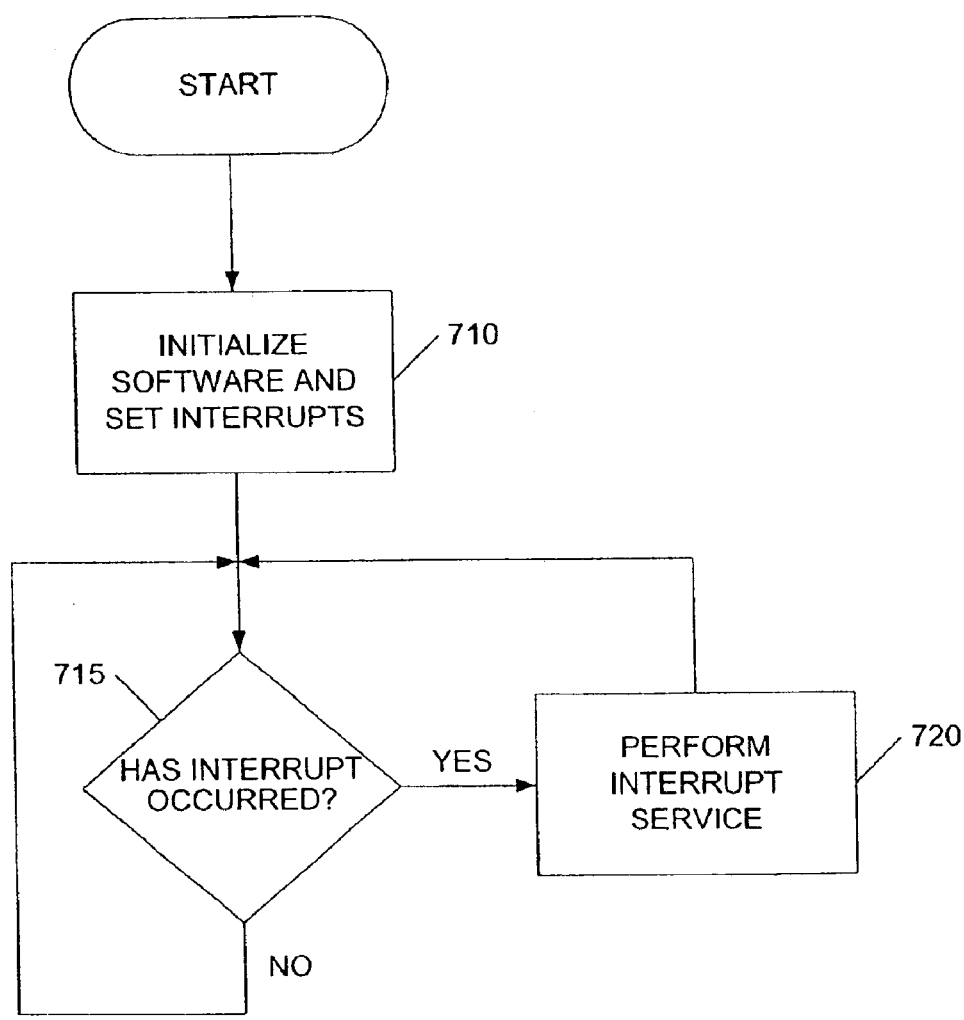
FIG. 19 is a flow chart of a software program.

When the microprocessor U7 receives the 5-VDC VCC signal, the microprocessor U7 loads a software program from memory into the microprocessor U7. As shown in FIG. 19 and at step 710, the software initializes the microprocessor U7 and sets one or more interrupts. The initializing of the software includes initializing a main timer and setting an error flag ERR to high. The error flag ERR remains high until the software validates everything is properly running. The interrupts include a periodic interrupt (e.g., a 260 microsecond interrupt), and an interrupt occurring on the rising edge of the current limit signal iLIMIT. Of course, other interrupts, timers, and error flags may be included.

At step 715, the software increase the main timer until an interrupt occurs. The interrupt may be the periodic interrupt or an interrupt due to the current limit signal iLIMIT. Once an interrupt occurs then the software proceeds to perform an interrupt service (step 720).

Figure 20A:
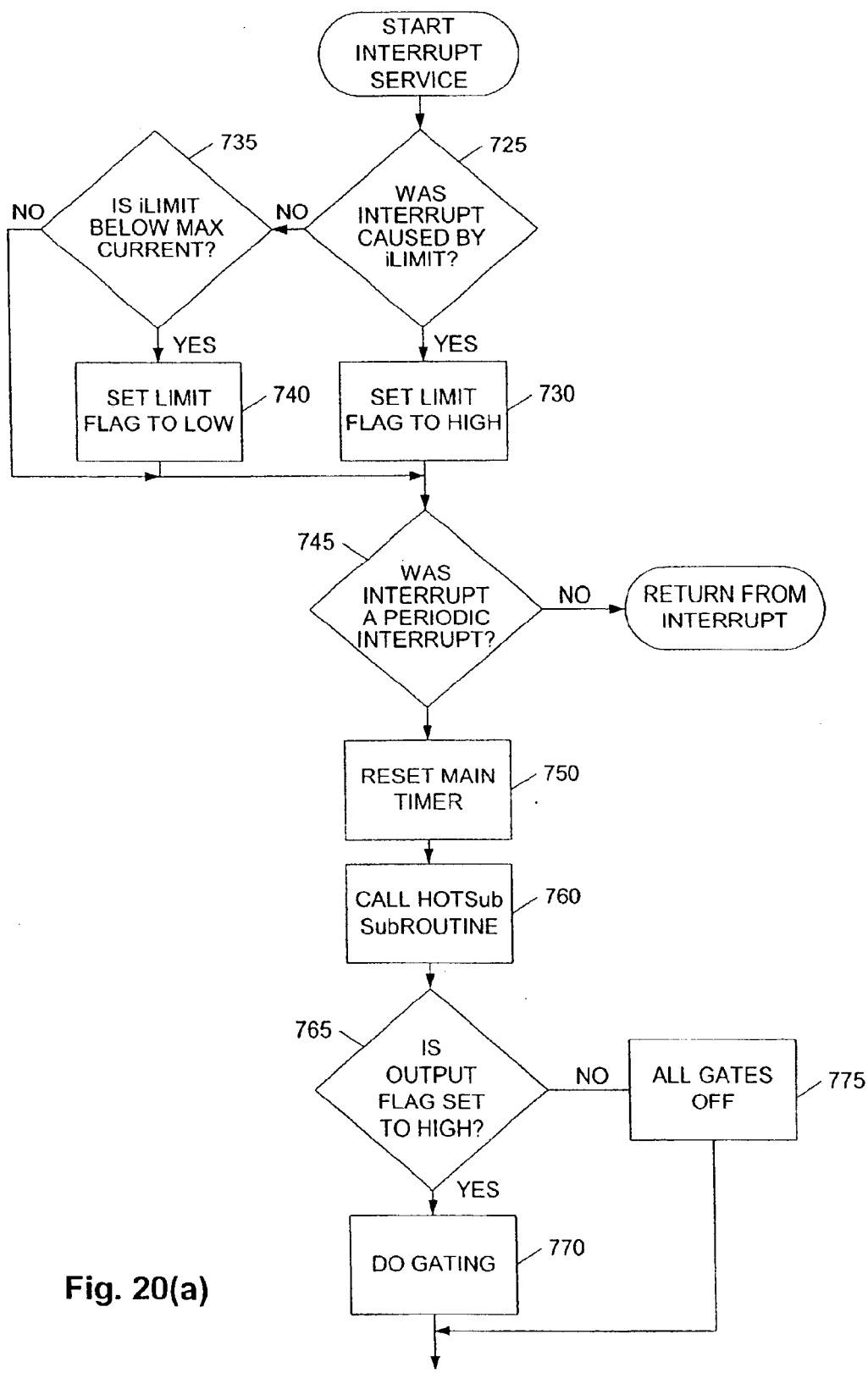
FIGS. 20(a) and 20(b) are flow charts of an interrupt service step shown in FIG. 19.
Figure 20B:
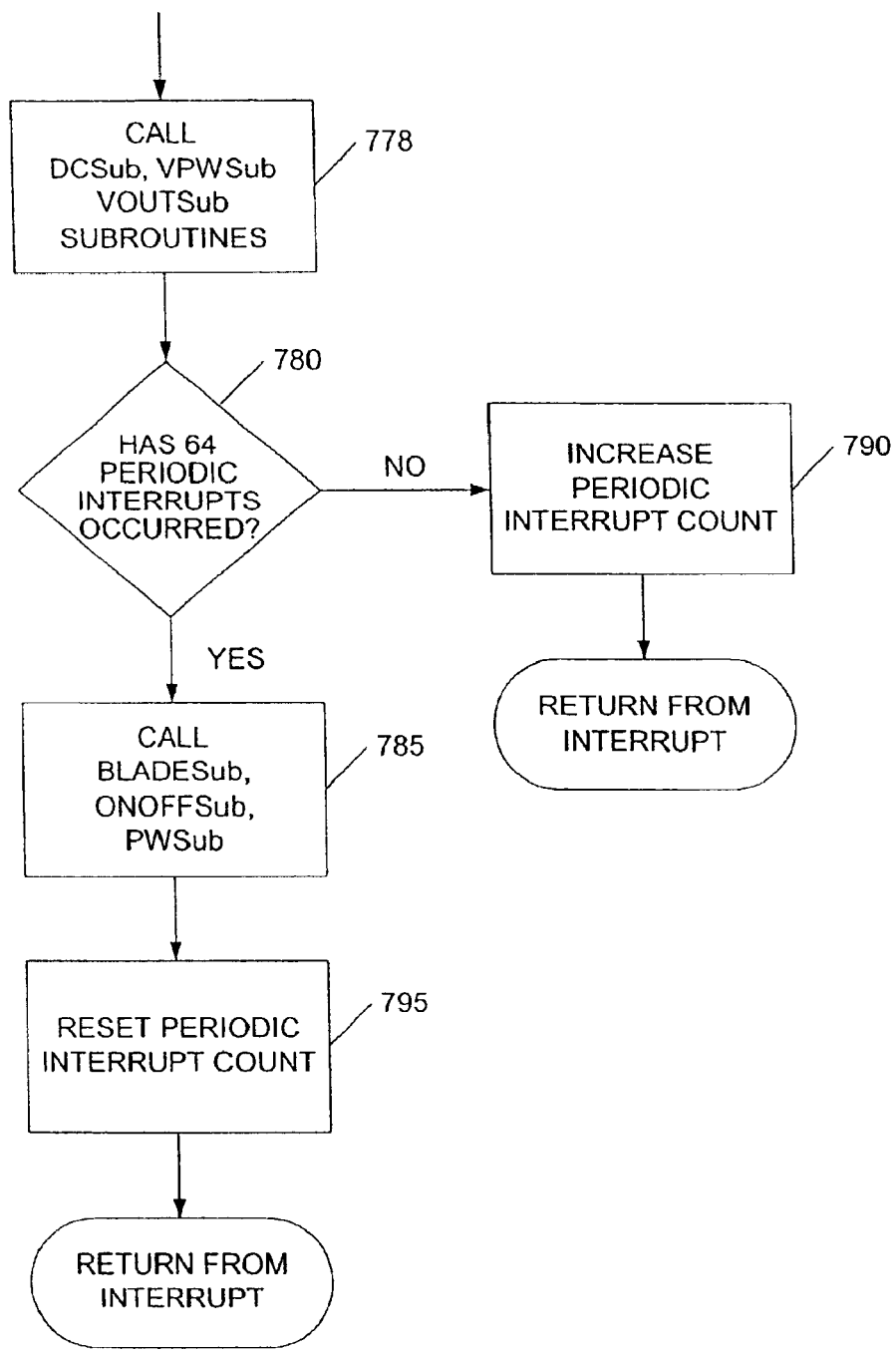

At step 720, the software performs the interrupt service. In general terms, the software determines the cause of the interrupt and performs necessary actions based on the cause. As shown in FIGS. 20a and 20b, if the interrupt is due to a high current (step 725), then the current being conducted through the MOSFETs is too high. When this occurs, the software sets a LIMIT flag to high (step 730). Setting the LIMIT flag to high informs later software modules to limit the amount of time the MOSFETs are on. Limiting the amount of time the MOSFETs are on reduces the amount of power and, consequently, current being conducted through the MOSFETs.

If the interrupt was due to a periodic interrupt (step 725), then the software proceeds to step 735. At step 735, the software samples the iLIMIT signal to determine if the amount of current being transmitted by the MOSFETs is within the desired limit. If the current is within limit, then the software sets the LIMIT flag to low (step 740). If the current is not within limit, then the software proceeds to step 745.

At step 745, the software determines whether the interrupt was a periodic interrupt. If the interrupt was a periodic interrupt, then software proceeds to step 750. Otherwise, the software returns from the interrupt service.

At step 750, the software resets the main timer for counting the next interrupt. At step 760, the software calls a HOTSub subroutine. The HOTSub subroutine checks whether the signal produced by the thermal shut down circuit is high. If the signal is high, then the MOSFETs are generating too much heat signifying that too much power is being generated. If the temperature is too hot, then a HOT counter is increased. If the temperature is satisfactory, then the HOT counter is decreased. If the HOT counter reaches a maximum count (e.g., fifteen), then the OUTPUT flag is set to low and the ERR flag is set to high. Setting the OUTPUT flag to low prevents gating of the MOSFETs (discussed below) and the ERR flag informs the processor a possible error is occurring. In addition a display may be used to inform the operator that the generator is too hot. The HOT counter includes a counting range (e.g., between zero and fifteen). Thus, the HOT counter allows the power circuitry 135 to generate some heat. But if too much heat is being generated for too long of a period of time, then the microprocessor U7 prevents electricity from being generated.

At step 765, the software determines whether the OUTPUT flag is set to high. If the OUTPUT flag is set to high, then the software has the microprocessor U7 generate the gating signals GATE1*a*, GATE1*b*, GATE2*a*, and GATE2*b* for controlling the bridge circuit 540 (step 770). The gating signals control the first and second drivers U4 and U5, which drive the bridge circuit 540. The gating signals are set by the software depending on the results of the PWSub subroutine (discussed below). In general, the software controls the gating of the microprocessor U7 based on the sensed bus voltage. The microprocessor U7 determines the pulse width PWM of the 120-VRMS, 60-Hz signal. If the OUTPUT flag is low (step 765), then the microprocessor U7 does not generate gating signals and the generator does not generate the 120-VRMS, 60-Hz signal (step 775).

At step 778, the software calls a DCSub subroutine, a VPWSub subroutine and a VOUTSub subroutine. The DCSub subroutine calculates the value of the DC bus voltage sensed by the voltage feedback circuit 580. The VPWSub subroutine determines the average value that each MOSFET is on. Based on the average value, the pulse width may be calculated. The VOUTSub subroutine calculates the RMS voltage being generated by the power circuitry 135. The RMS voltage is calculated using the sensed DC bus voltage and the calculated pulse width. For example, the RMS voltage may be calculated using a sum of squares calculation. If the RMS voltage is too high or too low, the software can adjust the gating signals. In addition, if the voltage is less than 90-VRMS for thirty continuous seconds, then the OUTPUT flag is set to low and the ERR flag is set to high. Similarly, if the voltage is less than 50-VRMS for two continuous seconds, then the OUTPUT flag is set to low and the ERR flag is set to high.

At step 780, the software determines whether sixty-four interrupts have occurred. If sixty-four interrupts have occurred, then the software performs an ONOFFSub subroutine, a BLADESub subroutine, and a PWSub subroutine (step 785). These subroutines do not need to be performed every interrupt. Of course, sixty-four is an arbitrary number and other counters may be used. If sixty-four interrupts have not occurred (step 780), then the software increases the interrupt counter (step 790) and returns from the interrupt service.

The ONOFFSub subroutine determines whether the on/off switch for generating the 120-VRMS, 60-Hz signal is on. If the on/off switch is off then it sets the ERR flag to low. Thus, the user has to "reset" the generator 120. For example, when the engine 110 first starts combusting, the generator 120 does not initially start generating power and accidentally cause damage to an attached load. The operator must turn the generator off and then on before the system will start generating. In addition, the software determines whether an initial DC bus voltage is greater than 120-VDC. If the DC bus voltage is greater than 120-VDC, then the software sets the OUTPUT flag to high. Thus, before the power circuitry 135 generates an output, the DC bus voltage must be at least 120-VDC. Of course, other voltages may be used.

The BLADESub subroutine determines whether either the blade signal or the interrupt signal is set to high. If either are high, then the ERR flag is set to high and the output flag is set to low. For example, if the generator is mounted on a lawnmower, then the operator cannot have the blade on and generate the 120-VRMS, 60-Hz signal at the same time. Similarly, for other vehicles, other interrupts may be used.

The PWSub subroutine uses the values calculated by the VOUTSub, VPWSub and DCSub subroutine to determine which gate signals should be active for driving the bridge circuit. Once the calculation is performed, the software resets the periodic interrupt count (step 795) and returns from the interrupt to step 715 (FIG. 19).

As can be seen from the above, the present invention provides a vehicle including a generator. Various features and advantages of the invention are set forth in the following claims.

What is claimed is:

1. An apparatus comprising:
   an engine including
      a shaft having a longitudinal axis, and
      a housing having a structure;
   a stator including a core and conductors disposed on the core, the core comprising
      a first plurality of laminations defining a first inner surface surrounding the longitudinal axis and comprising a first lamination, the first inner surface being disposed a first radius from the longitudinal axis in a radial plane, the first lamination having a first surface transverse to the axis, the first surface having a first width in the radial plane,
      a second plurality of laminations disposed adjacent to the first plurality of laminations, the second plurality of laminations defining a second inner surface surrounding the longitudinal axis and comprising a second lamination disposed adjacent to the first lamination, the second inner surface being disposed a second radius from the longitudinal axis in the radial plane, the second radius being greater than the first radius, the second lamination having a second surface partially disposed adjacent to the first surface and transverse to the axis, the second surface having a second width in the radial plane, the second width being less than the first width;

a rotor coupled to the shaft, at least a portion of the rotor surrounding at least a portion of the core;

wherein the first lamination includes a shelf defined by the portion of the first surface not being disposed adjacent to the second surface in the radial plane, and wherein the shelf and a portion of the second inner surface define a recess; and wherein the structure of the housing extends into the recess.

2. An apparatus as set forth in claim 1 wherein the core defines an aperture in the radial plane, and wherein the aperture is disposed in only the first lamination of the first lamination and the second lamination.

3. An apparatus as set forth in claim 2 wherein the aperture receives a fastener that interconnects the stator with the housing.

* * * * *